United States Patent
La

(10) Patent No.: US 6,695,209 B1
(45) Date of Patent: Feb. 24, 2004

(54) TRIGGERLESS OPTICAL READER WITH SIGNAL ENHANCEMENT FEATURES

(75) Inventor: Chay K. La, New York, NY (US)

(73) Assignee: PSC Scanning, Inc., Eugene, OR (US)

( * ) Notice: Subject to any disclaimer, the term of this patent is extended or adjusted under 35 U.S.C. 154(b) by 0 days.

(21) Appl. No.: 09/412,015

(22) Filed: Oct. 4, 1999

(51) Int. Cl.$^7$ .............................. G06K 7/10; G06K 5/00
(52) U.S. Cl. ............................ 235/462.2; 235/462.24; 235/462.25
(58) Field of Search ........................... 235/462.1, 462.2, 235/462.08, 462.25, 462.31, 494; 356/237.2, 237.4, 235.5

(56) References Cited

U.S. PATENT DOCUMENTS

| | | | |
|---|---|---|---|
| 5,237,161 A | | 8/1993 | Grodevant .................. 235/462 |
| 5,260,554 A | | 11/1993 | Grodevant .................. 235/462 |
| 5,274,219 A | | 12/1993 | Harden et al. .............. 235/462 |
| 5,331,176 A | * | 7/1994 | Sant'Anselmo et al. ...................... 235/472.01 |
| 5,565,669 A | * | 10/1996 | Liu ........................ 235/462.01 |
| 5,600,121 A | * | 2/1997 | Kahn et al. ............. 235/472.01 |
| 5,612,529 A | | 3/1997 | Coleman ................... 235/455 |
| 5,627,360 A | | 5/1997 | Rudeen ...................... 235/462 |
| 5,702,059 A | * | 12/1997 | Chu et al. ............... 235/462.45 |
| 5,744,790 A | | 4/1998 | Li ............................ 235/472 |
| 5,756,981 A | * | 5/1998 | Roustaei et al. ........ 235/462.01 |
| 5,811,828 A | * | 9/1998 | Laser ...................... 235/462.01 |
| 5,920,061 A | | 7/1999 | Feng ..................... 235/472.01 |
| 5,949,052 A | | 9/1999 | Longacre, Jr. et al. .. 235/462.08 |
| 6,088,482 A | * | 7/2000 | He et al. .................... 235/494 |
| 6,097,483 A | * | 8/2000 | Komatsu .................. 356/237.2 |
| 6,179,208 B1 | * | 1/2001 | Feng ..................... 235/472.01 |
| 6,336,587 B1 | * | 1/2002 | He et al. ................ 235/462.45 |
| 6,340,114 B1 | * | 1/2002 | Correa et al. .......... 235/462.22 |
| 6,415,982 B2 | * | 7/2002 | Bridgelall et al. ..... 235/472.01 |

FOREIGN PATENT DOCUMENTS

| | | | |
|---|---|---|---|
| EP | 0152733 A | * 8/1985 | .................. 235/494 |
| EP | 0 524 029 A2 | 1/1993 | |
| EP | 0 661 661 A1 | 7/1995 | ............ G06K/7/10 |
| WO | WO 97/15024 | 4/1997 | ............ G06K/7/10 |

* cited by examiner

*Primary Examiner*—Daniel St. Cyr
(74) *Attorney, Agent, or Firm*—Stoel Rives LLP

(57) ABSTRACT

An optical reader includes targeting illuminators (e.g., LEDs) which generate a predetermined illumination pattern upon a target. The optical reader captures an image of the target and processes the captured image to determine whether the target is off-pitch or skewed, by analyzing the appearance and characteristics of the predetermined illumination pattern. The illumination pattern may consist of two identical triangles adjacently located but slightly separated so as to cause the pattern to be symmetrical when the target is at perfect alignment, but having shifting characteristics when the target is off-pitch or skewed. The optical reader may use the knowledge of pitch and skew to adjust the captured image. Triggerless operation of the optical reader is provided by placing the optical reader in a cradle and stand having a base with a known target printed on or affixed thereto, within the viewpath of the optical reader. So long as the known target is in the view of the optical reader, it remains in a standby mode, and leaves the standby mode and begins reading when a target is interposed or the optical reader is removed from the cradle. Automatic gain control circuitry is provided having a gain control level which is continuously adjusted when the optical reader is in a standby mode. When the optical reader leaves the standby mode and begins reading, the gain level is pre-adjusted, resulting in a faster read of good data.

24 Claims, 10 Drawing Sheets

TRIGGERLESS OPTICAL READER WITH SIGNAL ENHANCEMENT FEATURES

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1.) Field of the Invention

The field of the present invention relates to optical reading systems and, more particularly, to methods and apparatus for triggerless optical reading and for improving signal quality and readability in optical readers of bar codes, symbols and other indicia.

2.) Background

Optical readers have been developed for reading bar codes, symbols and other indicia. Most conventional barcode readers use one of two general approaches to gathering data: either by using a flying-spot laser scanner, or by using a photosensitive imaging device. In flying-spot laser scanning systems, a beam of light is swept across a target barcode, and the reflected and/or refracted light from the target is detected and processed to decode the barcode. In imaging barcode readers, an image of the barcode is captured using an array of pixels (for example, a CCD array, or an active or passive CMOS array), and the captured image is processed to decode the barcode. Either a one dimensional array of pixels or a two-dimensional array of pixels can be used to capture the barcode data. A light source may also be used to illuminate the target.

Many optical readers are specifically designed for reading barcode labels. A barcode label comprises a series of parallel dark bars of varying widths with intervening light spaces, also of varying widths. The information encoded in the barcode is represented by the specific sequence of bar and space widths, the precise nature of this representation depending on the particular barcode symbology in use. Two dimensional barcodes and other codes are also becoming increasingly common, and include, for example, stacked codes (e.g., Code 16K, Code 49, etc.), matrix codes (e.g., DataMatrix, Code 1, Maxicode, etc.), PDF417, micro-PDF, and RSS codes. Two-dimensional codes may be present as part of a composite code or linked code, wherein a one-dimensional barcode appears on the same label as, and indicates the presence of, a two-dimensional barcode. When bar code information is read by the optical reader, a decoding process is carried out to interpret the information encoded on the barcode.

To read a barcode or other similar symbol, light detected by the photosensitive element (e.g., photodiode or CCD or CMOS array) results in generation of an electronic signal having an amplitude that alternates between two general levels, one level representative of the dark bars and the other level representative of the light spaces. The temporal widths of these alternating pulses of high and low levels correspond to the spatial widths of the bars and spaces, or other relatively light and dark features of the target. The sequence of alternating pulses of varying widths may be detected and measured, and such data presented to an electronic decoding apparatus for decoding of the information encoded in the barcode or other symbol.

To detect and measure the features of a read bar code or symbol, high-to-low or low-to-high transitions (i.e., edges) in the raw electronic signal are detected. A common and well known technique for edge detection is second derivative signal processing. In second derivative signal processing systems, optical edges result in peaks in the first derivative signal, and zero crossings in the second derivative signal. In such systems, zero crossings of the second derivative of the electronic signal are found during selected timing intervals as a means of detecting valid transitions. Examples of this technique are described in U.S. Pat. No. 4,000,397 entitled "Signal Processor Method and Apparatus" issued in the name of Hebert et al., and in U.S. Pat. No. 5,925,868 entitled "Method and Apparatus for Determining Transitions Between Relatively High and Low Levels in an Input Signal" issued in the name of Arends et al., and in U.S. Pat. No. 5,923,023 entitled "Method and Apparauts for Detecting Transitions in an Input Signal" also issued in the name of Arends et al. Each of the three foregoing patents are assigned to the assignee of the present application, and each is hereby incorporated by reference as if fully set forth herein.

Edge detection is commonly employed in flying-spot laser scanners, which typically read in a pattern of lines and therefore are particularly well suited to linear processing. For imaging devices which capture an entire image at one time, such as by using a CCD or CMOS imaging array, other types of processing may occur instead of traditional edge detection. For example, as the image data from the CCD or CMOS device is read out, the image data may be digitized and stored in memory, typically in either a binary or gray-scale representation. A processor may then apply various algorithms to search the captured image and attempt to identify features in the image corresponding to bar codes or other symbols to be detected.

Triggerless operation of bar code scanners has been found to be convenient in certain applications. One type of triggerless "hands free" bar code or symbol scanner is described in U.S. Pat. No. 5,260,554 issued on Nov. 9, 1993 to Scott R. Grodevant, and assigned to the assignee of the present invention. As described therein, a triggerless optical reader is placed in a cradle of a stand so that the view of the optical reader points downward towards the base of the stand. A reflector is affixed to the upper surface of the base of the stand, within the viewpath of the optical reader. The optical reader monitors the presence of the reflector and, so long as it is present, the optical reader does not initiate a scan. However, when an object is interposed between the scan head and the reflector, the reflector is blocked and, when failing to detect the reflector, the optical reader initiates a scan. The operator therefore does not need to pull a trigger on the optical reader to initiate scanning.

The optical reader described in U.S. Pat. No. 5,260,554 has a flying-spot laser scanner front end. The optical reader pulses the laser on and off with a duty cycle of approximately 5%, and monitors the return pulses. Because of the high reflectivity of the reflector, the return pulses have a relatively high intensity. After a fairly large sample (e.g., 50) of pulses, a decision as to the presence of the reflector is made. Specifically, the number of edges detected is compared against a determined value, and if the number of edges matches the expected number, the reflector is assumed to be present. Otherwise, the reflector is assumed to be blocked or missing (i.e., the optical reader has been removed from the cradle), and the optical reader automatically begins to scan.

While the optical reader described in U.S. Pat. No. 5,260,554 has many advantages, the technique described therein is particularly well suited for flying-spot laser scanners. Possibilities for optimizing the technique for other types of optical readers may exist.

Another technique for automatically detecting objects in the field of view of the optical scanner is described in U.S. Pat. No. 5,949,052 issued on Sep. 7, 1999 to A problem that exists in the field of optical readers relying on imaging devices such as CCDs is that a wide range of input light levels can occur, depending on such factors as target distance and ambient light level. Processing of the imaging device output signal can be made more difficult due to the unpredictable nature of the signal amplitude from read to read. A related problem is that, due to the effect of ambient light, some optical readers can be temporarily "blinded" by a high ambient light level (such as pointing the optical reader at the sun or a bright light), which can cause saturation of the photosensitive device used in the optical reader.

Another problem that exists in the field of optical readers is attempting to read a target that is not perfectly oriented within the field of view of the optical reader, but rather is skewed or angled with respect to the optical reader. With manual presentation of products bearing labels and symbols to the optical reader, the chances are high that the target to be read will not be perfectly aligned with respect to the imaging plane of the optical reader. When a target is skewed, meaning that it is presented at an angle such that one side is closer than the other, features at one side of the target appear larger than at the other side of the target. Similarly, when a target is off-pitch, meaning that it is presented at an angle such that the top is closer than the bottom or vice versa, features at the top appear larger than those at the bottom, or vice versa. Target skew and pitch can cause errors in attempting to read or decode the target.

It would be advantageous to provide an optical reader having an ability to detect the characteristics of the target prior to reading, including characteristics such as target skew and pitch. It would further be advantageous to provide an optical reader having a more nearly constant input signal level from an imaging device, or that is not subject to saturation of the photosensor due to ambient light effects prior to reading. It would further be advantageous to provide a triggerless optical reader having an automatic reading capability, using methods that are particularly adapted to such a reader.

SUMMARY OF THE INVENTION

The present invention is directed in one aspect to a method and apparatus for reading a barcode or other symbol, indicia, character or combination thereof with improved accuracy be detecting characteristics of the target such as pitch and skew.

In one embodiment as described herein, an optical reader includes targeting illuminators (e.g., LEDs) which generate a predetermined illumination pattern upon a target. The optical reader captures an image of the target and processes the captured image to determine whether the target is off-pitch or skewed, by analyzing the appearance and characteristics of the predetermined illumination pattern.

In a preferred embodiment as described herein, the illumination pattern consists of two identical triangles adjacently located but slightly separated so as to cause the pattern to be symmetrical when the target is at perfect alignment. When the target is skewed, one of the two triangles will appear to be longer than the other. The optical reader processes the captured image to detect the different in length of the two triangles, and determines the angle of skew thereby. When the target is off-pitch, the two triangles will appear to be separated by a greater amount at the top of the two triangles than at the bottom, or vice versa. The optical reader processes the captured image to detect the difference in separations at the bottom and top of the two triangles, and determines the angle of pitch thereby. The optical reader may use the knowledge of pitch and skew to improve reading of the target thereafter.

In another aspect of the invention, automatic gain control circuitry is provided in an optical reader utilizing an imaging device to capture an image of a target. The automatic gain control circuitry provides a more nearly constant input signal to subsequent circuitry which interprets the image data and which may attempt to locate a bar code, symbol or other indicia in said data. In a particular embodiment, the gain level is continuously adjusted when the optical reader is in a standby mode. When the optical reader leaves the standby mode and begins reading, the gain level of the automatic gain control is pre-adjusted, resulting in a faster read of good data.

In another aspect of the invention, a triggerless optical reader is provided. The triggerless optical reader is placed in a cradle of a stand and positioned to view downwards therefrom towards the base of the stand. A known target is affixed to or imprinted upon the upper surface of the base, within the viewpath of the optical reader. The triggerless optical reader continuously captures images and attempts to identify the known target. So long as the known target is identified, the optical reader will remain in a standby mode. If the target is obstructed or the optical reader removed from the cradle, the optical reader will no longer be able to view the known target. The optical reader will then enter a reading mode. In a preferred embodiment as described herein, the known target is a solid circle on a contrasting background.

Further embodiments, variations, and enhancements are also described herein or reflected in the drawings.

DETAILED DESCRIPTION OF THE PREFERRED EMBODIMENTS

Figure 1:
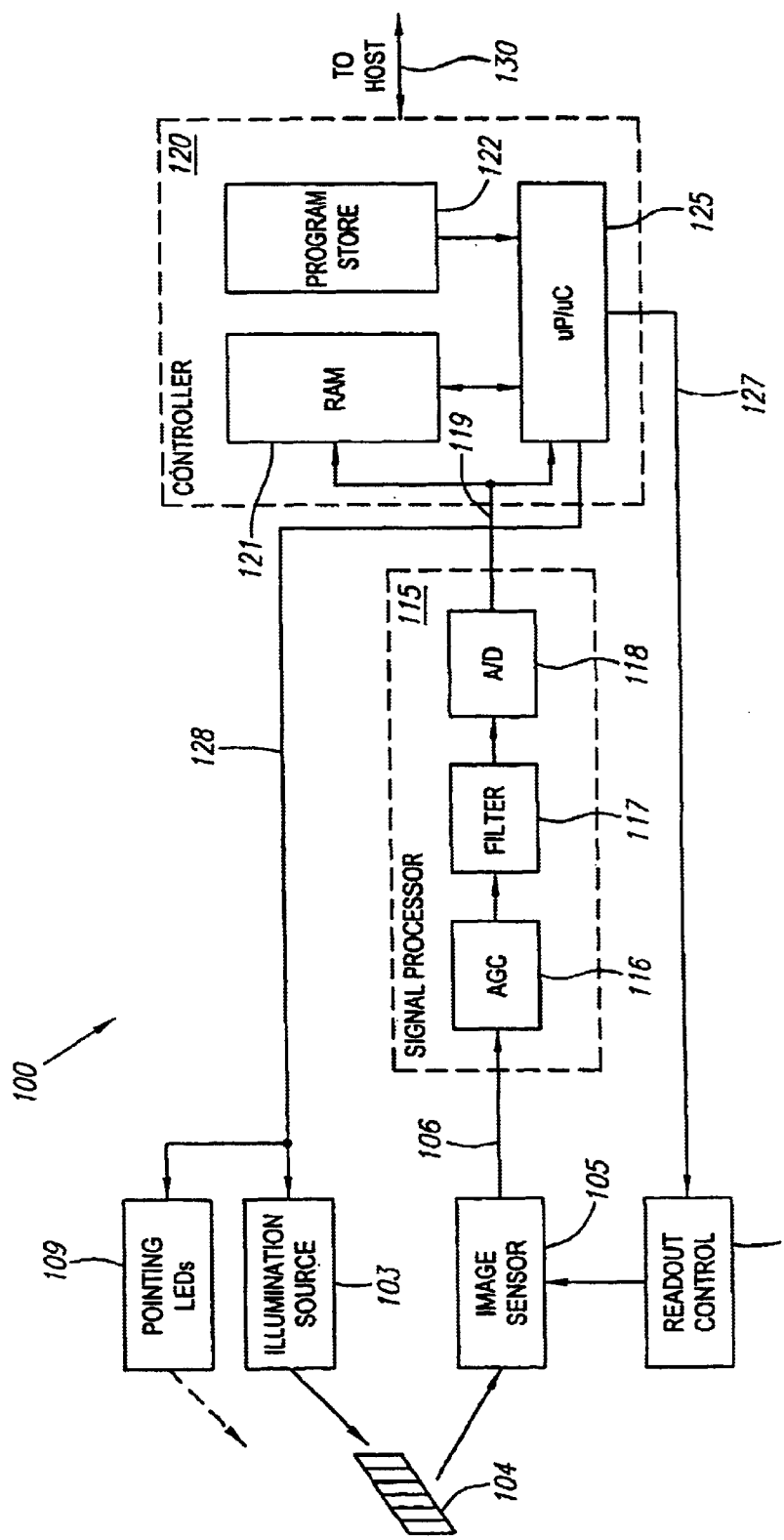
FIG. 1 is a block diagram of one embodiment of an optical reader in accordance with various aspects of the present invention.

FIG. 1 is a schematic block diagram of a preferred embodiment of an optical reader 100 in accordance with various aspects of the present invention, having certain features useful in determining target characteristics such as skew and pitch. The optical reader 100 depicted in FIG. 1 includes an image sensor 105 electrically connected to a signal processor 115, which is in turn electrically connected to a controller 120. The image sensor 105 and signal processor 115 collectively provide output data to the controller 120, and the controller 120 provides control signals to the various system components.

The image sensor 105 preferably comprises an active pixel CMOS area array. Alternatively, however, the image sensor 105 may comprise other types of imaging devices, such as a CCD array (either a CCD linear array or area array), an active-pixel CMOS linear array, or else a passive CMOS array (either a linear or area array), for example. The image sensor 210 may also, in certain embodiments, comprise several intersecting or crossing linear arrays of CMOS pixels or CCD pixels, oriented at different angles. An example of one type of active pixel CMOS array that may be used as image sensor 105 in certain embodiments is described in copending U.S. patent application Ser. No. 08/697,408, which is assigned to the assignee of the present invention, and is hereby incorporated by reference as if set forth fully herein.

A lens and possibly other optics (e.g., one or more folding mirrors) (not shown in FIG. 1) may be positioned so as to focus light on the image sensor 105.

A readout control circuit 112 is connected to the image sensor 105, and operates under control of the controller 120. The readout control 112 may comprise, for example, clocking circuitry to read out the pixels of the imaging array 105 sequentially, or in a particular pattern, in addition to logic circuitry for responding to commands from the controller 120. The readout control 112 may also comprise adaptive exposure control circuitry, such as described in relation to an active-pixel CMOS image sensor in copending U.S. patent application Ser. No. 08/697,408, previously incorporated by reference herein.

The controller 120 preferably comprises a microprocessor or microcontroller (uP/uC) 125, a program store 122 (preferably comprising non-volatile memory, such as a ROM) for storing any necessary program code, and a memory 121 (preferably comprising random-access memory (RAM)) for storing program variables, data, and the like. The design of uP/uC-based controllers is generally well known in the field of imaging readers. Rather than using a uP/uC 125, the controller 120 may be based on, for example, a field programmable gate array (FPGA), microprogrammed bit-slice hardware, digital signal processors, or hard-wired control logic.

In addition to the aforementioned components, the optical reader 100 further comprises an illumination source 103 and, preferably, targeting light-emitting diodes (LEDs) 109, the function and operation of which is described hereinafter. The illumination source 103 itself may comprise a row of LEDs, which are used for illumination purposes, as opposed to targeting, or alternatively may comprise flash strobes, or incandescent or fluorescent lamps. In a particular embodiment, the image sensor 105 comprises a CMOS array having high sensitivity to infrared radiation, and the illumination source comprises an infrared light source. Such an embodiment has an advantage of having less visible light and hence being more pleasing to the eye. As another possible alternative, the illumination source 103 may be omitted altogether, and the image sensor 105 may rely on ambient light to illuminate the target 104. Various types of ambient light imaging systems are described, for example, in U.S. Pat. Nos. 5,770,847 and 5,814,803, both of which are incorporated by reference as if set forth fully herein.

Reading barcodes, symbols, characters or other indicia or targets is preferably accomplished by capturing data using the image sensor 105, and processing the captured data with the signal processor 115 and the controller 120. In a preferred embodiment, the illumination source 103 is activated to illuminate the target 104. Light from the illumination source 103 (and/or ambient light) is reflected from the target 104 and detected by the image sensor 105. As noted above, a preferred image sensor 105 is constructed as an active pixel CMOS device containing a two-dimensional array of pixels. Each pixel of the image sensor 105 detects an amount of light incident at its particular location and stores an electrical charge that varies as a function of the incident light. After the image sensor 105 has been exposed for a predefined (or adaptive) exposure period, data from all the CMOS pixels of the image sensor 105 is sequentially read out in a selectable pattern (which may be row-by-row, column-by-column, or some other pattern). The data read out from the image sensor 105 results in the generation of an analog video output signal 106.

Alternatively, where the image sensor 105 comprises a one-dimensional CMOS imaging array (i.e., a linear array) or a linear CCD array that only images a single line of a target 104 at a time, such a linear imaging array may be used to build up a two dimensional image by moving the target 104 across the field of view of the image sensor 105, or vice versa, and capturing successive one-dimensional scans. The resulting built-up image may be stored in a RAM, and, once captured, can be processed in the same manner as an image captured using a two-dimensional array.

In a preferred embodiment, the signal processor 115 conditions the analog video output signal 106 received from the image sensor 105 and generates an output signal 119 which is passed along to the controller 120. Either analog or digital circuitry, or both, may be utilized in the signal processor 115. The signal processor preferably comprises an automatic gain control (AGC) circuit 116, a filter 117, and, if desired, an analog-to-digital (A/D) converter 118. The output signal 119 of the signal processor 115 preferably comprises a stream of digitized, gray-scale pixel data (represented by any suitable number of bits, depending upon accuracy requirements and component tolerances) for each pixel read out of the image sensor 105.

Alternatively, the output signal 119 may comprise binary data (0 or 1) for each pixel, or else may comprise run-length encoded binary data for groups of pixels. To obtain run-length encoded binary data, the image sensor output signal 106 may, at some point in the processing performed by the signal processor 115, be edge-detected according to any of a wide variety of techniques known in the art and used commonly in flying-spot laser scanners. A variety of such edge detection techniques are described in, for example, U.S. Pat. No. 5,463,211 (Arends et al.) and U.S. Pat. No. 4,000,397 (Hebert et al.), both of which are hereby incorporated by reference as if set forth fully herein. For example, the signal processor 115 may locate edges of the image sensor output signal 106 by detecting when its second derivative crosses zero. A noise reduction circuit may be employed to eliminate or reduce edges in the image sensor output signal 106 signal attributed to noise, and may operate, for example, by discarding or ignoring edges detected whenever the first derivative of the amplified signal is below a threshold value.

The output signal 119 from the signal processor 115 is provided to the controller 120. Transfer of the data from the signal processor 115 to the controller 120 may be accomplished by any of a number of suitable techniques. For example, the signal processor output signal 119 may be in the form of digital, gray-scale pixel data, in which the lines of pixel data are sent one at a time, sequentially, with the data from individual pixels sent sequentially within each line. The digital pixel data may be loaded into the memory 121 of controller 120, in a special data structure therein provided for image capture. The signal processor 115 or controller 120 may also utilize a first-in-first-out (FIFO) or other type of buffer (not shown) to temporarily hold the digital image data. Other approaches to transferring the digital image data derived from the image sensor 105 to the controller 120 may also be used, as will be apparent to those skilled in the art.

In a preferred embodiment, the uP/uC 125 of the controller 120 draws upon program code stored in the program store 122, and runs the program code to control the various functions of the optical reader 100, and to decode the digitized image data received from the signal processor 115. The program code may also control, among other things, the illumination source 103, the readout control 112, and the signal processor 115. After receiving the digital image data from the signal processor 115, the controller 120 then decodes the digital image data to determine the information represented by the barcode, symbol, or other indicia contained within the captured image of the target 104. Preferably, decoding is accomplished by identifying which areas of the captured image contain barcodes or symbols or recognizable portions thereof, and then determining the information represented by those barcodes based on the patterns of light and dark pixels within the identified areas. Design and implementation of program code for decoding the captured image data is considered well within the purview of those skilled in the art.

Data may optionally be outputted from the controller 120 to a host system (not shown) over host connection 130. The output data transmitted over the host connection 130 may represent, for example, the information or value of one or more target barcodes, symbols or other indicia, and may be provided in any desired parallel, serial or other format including, for example, a Centronics format, RS232 format, or Universal Serial Bus (USB) format.

Figure 2:
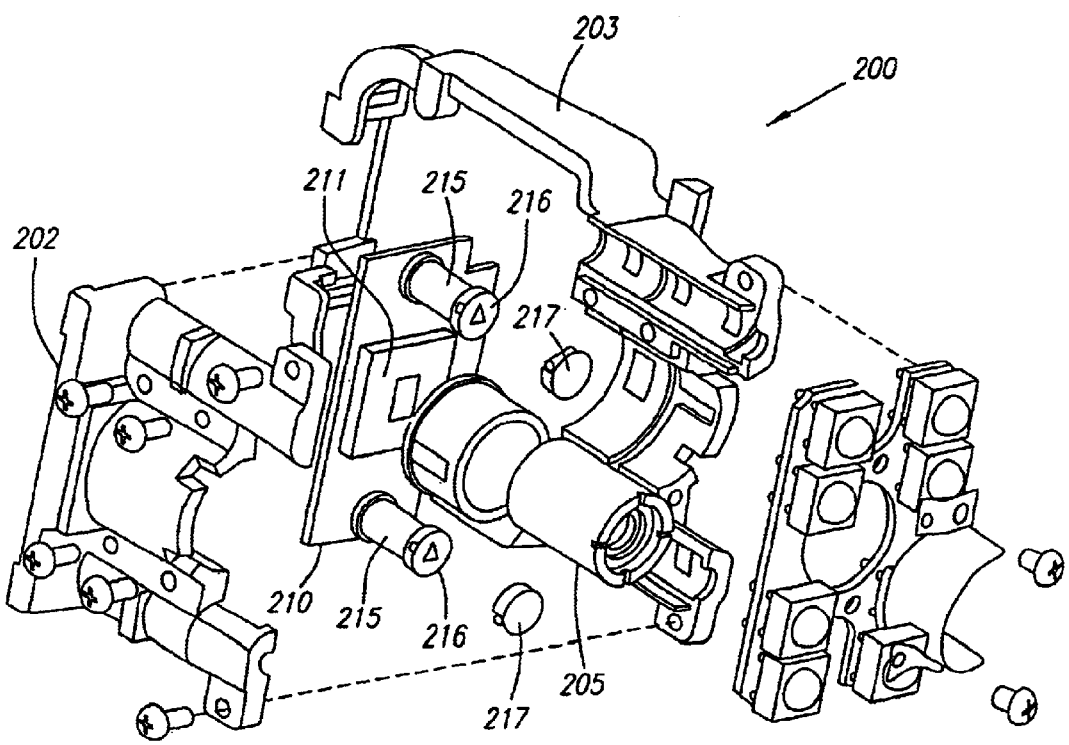
FIG. 2 is an assembly diagram of a optical reading head, illustrating the placement of targeting LEDs used to derive information about the orientation of the target.

In a preferred embodiment as described herein, targeting LEDs 109 are used to derive information about the orientation of the target 104. FIG. 2 is an assembly diagram of one type of optical reading head 200 having targeting LEDs that may be used for such a purpose. As shown in FIG. 2, the optical reading head 200 comprises molded left and right members 202 and 203, respectively, which are of a design (i.e., size and shape) so that they fit together as shown in FIG. 2. A mounting board 210 (e.g., a printed circuit board (PCB)) fits inside the enclosure created by left and right members 202, 203. On a front surface of the mounting board 210 is placed an image sensor 211 (such as image sensor 105 shown in FIG. 1). A lens within a cylindrical lens housing 205 is positioned so as to focus light on the image sensor 211.

Also mounted on the front surface of the mounting board 210, along the central axis of the image sensor 211, are LEDs 215, each of which has a pattern generation mask 216 placed atop it. A lens 217 is optionally positioned in front of each LED 215 so as to focus outgoing light from the LED 215 on a target. The LED 215, pattern generation mask 216 and lens 217 collectively form a preferred targeting LED.

Figure 3:
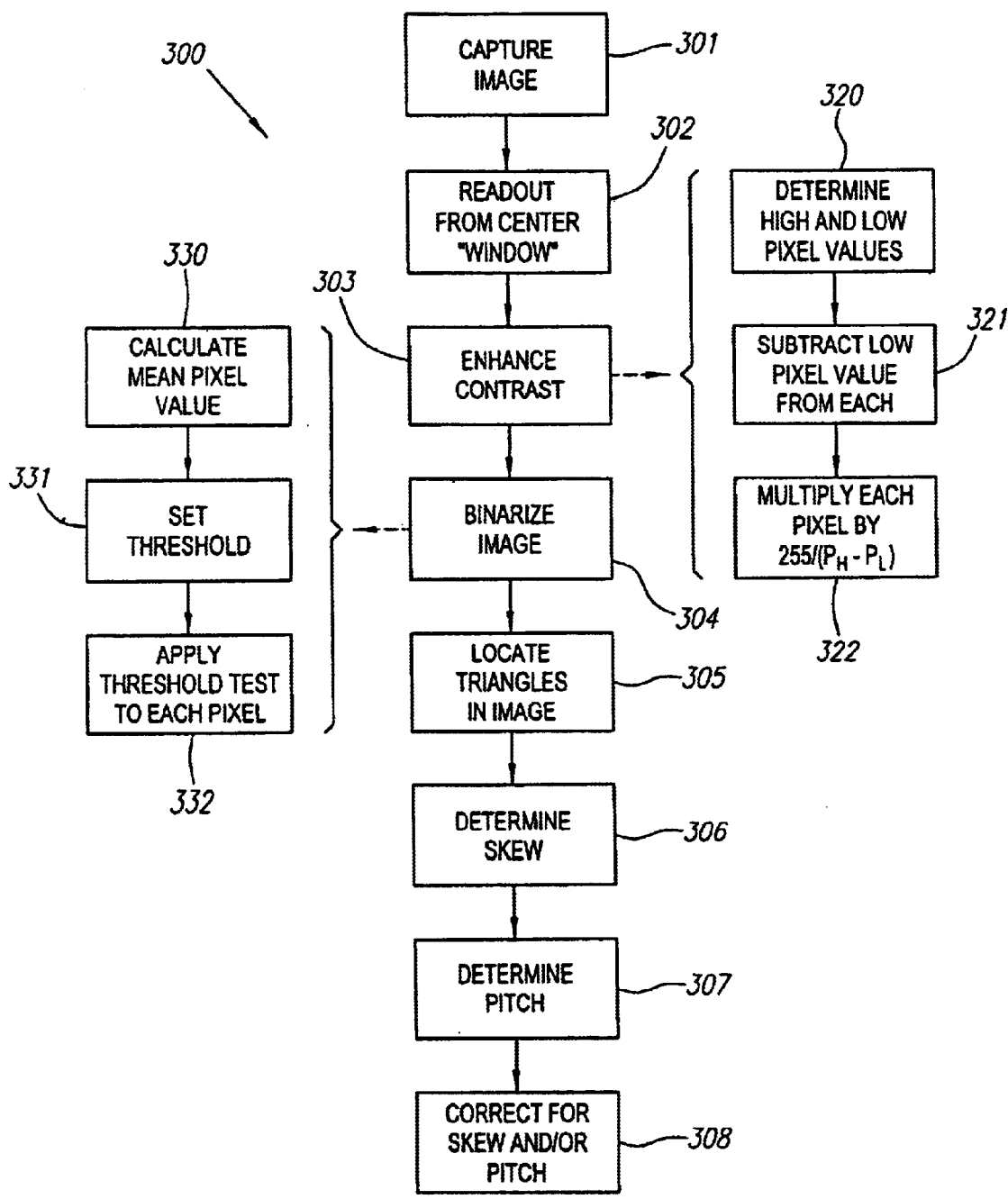
FIG. 3 is a flow chart in accordance with a preferred process for determining characteristics of a target using feedback obtained from illumination patterns generated by targeting LEDs.

In the embodiment illustrated in FIG. 2, each pattern generation mask 216 causes the LED 215 to illuminate the target in a triangle-shaped illumination pattern. Such an illumination pattern has certain advantages when attempting to determine target orientation, as further described herein. However, it will be understood that many other illumination patterns could be used and would be workable in accordance with the various embodiments as described herein, so long as the illumination pattern selected is recognizable and provides meaningful feedback information for determining aspects of the target orientation. FIG. 3 is a flow chart in accordance with a preferred process 300 for determining characteristics of a target using feedback obtained from illumination patterns generated by targeting LEDs. While the steps of the process 300 are described with reference generally to the targeting LEDs 109 shown in FIG. 1, they would be applicable also to embodiments of optical readers utilizing targeting LEDs 215 shown in FIG. 2.

Figure 4:
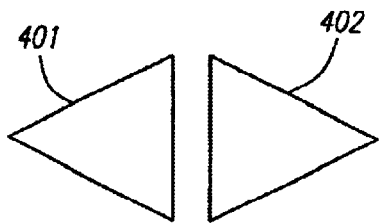
FIG. 4 is a diagram illustrating an illumination pattern used in a two-triangle targeting system, where no skew or pitch is present.

As shown in FIG. 3, in a first step 301, the targeting LEDs 109 are activated to illuminate the target, and an image is captured by the image sensor 105. The targeting LEDs 109 create a recognizable illumination pattern on the target 104; for example, a two-triangle illumination pattern may be generated by the targeting LEDs 109, as shown in FIG. 4. That is, a first partial illumination pattern (i.e., triangle 401) is created by one of the targeting LEDs 109, and a second partial illumination pattern (i.e., triangle 402) is created by another of the targeting LEDs 109. Preferably, the targeting LEDs 109 are two in number, and the first partial illumination pattern generated by the first targeting LED is symmetrical with the second partial illumination pattern generated by the second targeting LED, so as to facilitate the target-orientation processing downstream.

Figure 5:
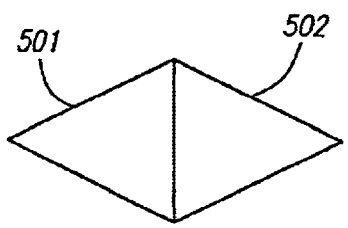
FIG. 5 is a diagram illustrating the illumination pattern of the two-triangle targeting system at perfect focus, in a preferred embodiment as described herein.

The targeting LEDs 109 focus their light outward so that the triangles 401, 402 are not touching. The focal distance of the targeting LEDs 109 may be selected so that when a target 104 is very close (e.g., a few inches), the triangles 501, 502 generated by the targeting LEDs 109 do touch, as illustrated in FIG. 5.

Figure 6A:
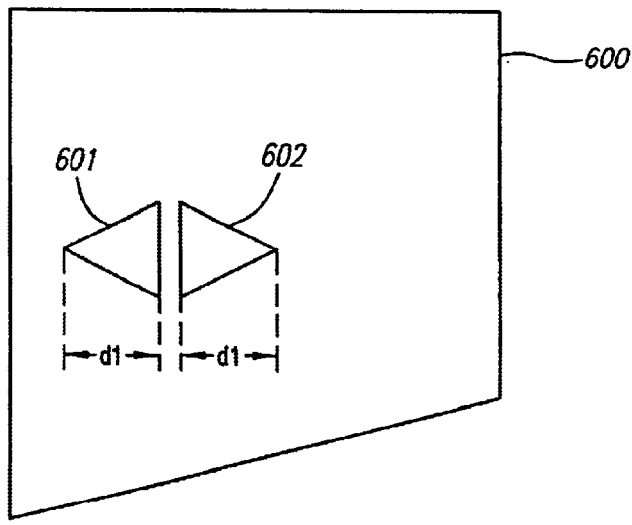
FIG. 6A is a diagram illustrating an illumination pattern created using the two-triangle targeting system in a situation where the target is skewed.
Figure 6B:
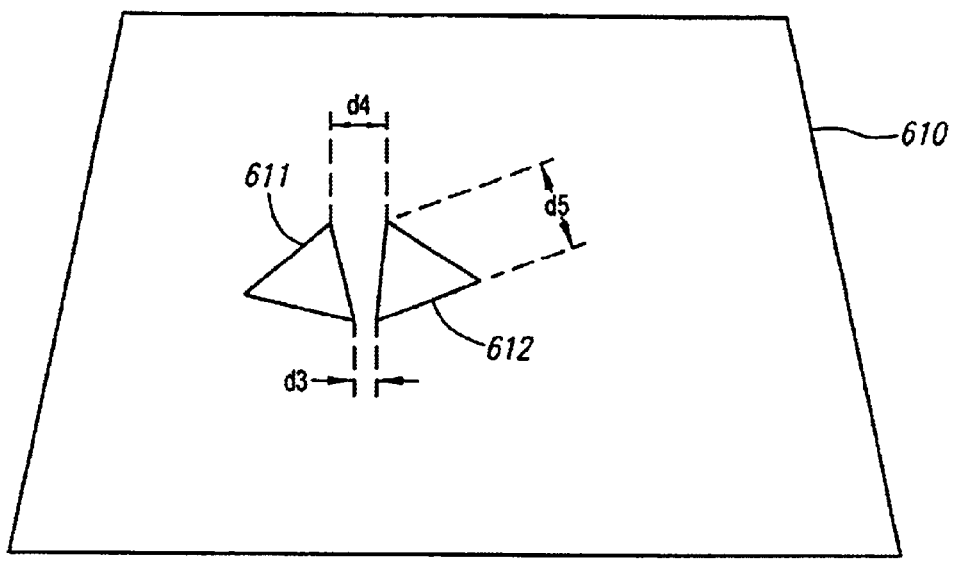
FIG. 6B is a diagram illustrating an illumination pattern created using the two-triangle targeting system in a situation where the target is off-pitch.
Figure 6C:
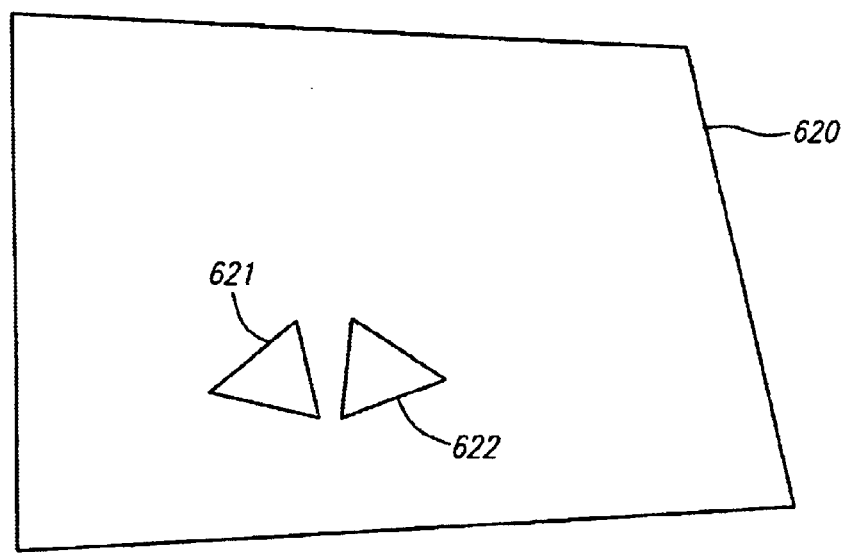
FIG. 6C is a diagram illustrating an illumination pattern created using the two-triangle targeting system in a situation where the target is both off-pitch and skewed.

In the illustration of FIG. 4, no skew or pitch of the target 104 is present. Therefore, the two triangles 401, 402 appear perfectly symmetrical. FIGS. 6A, 6B and 6C, on the other hand, illustrate situations in which the target 104 is skewed or off-pitch. For example, FIG. 6A illustrates an illumination pattern in a situation where the target 600 is skewed—that is, the target 600 is tilted so that it is closer (and hence appears larger) on its left, and is farther (and hence appears smaller) on its right. As shown in FIG. 6A, the left triangle 601 will have a width d1 that is shorter than the width d2 of the right triangle 602, indicating skew towards the right. Conversely, if the right triangle 602 has a width d2 that is shorter than the width d1 of the left triangle 601, it would indicate a skew towards the left.

On the other hand, if the target off-pitch, then the illumination pattern would show other effects. FIG. 6B, for example, is a diagram illustrating an illumination pattern created using a two-triangle targeting system in a situation where the target 610 is off-pitch. As shown in FIG. 6B, when the target 610 is off-pitch (that is, its bottom half appears larger/closer than its top half, or vice versa), then the left triangle 611 and right triangle 612 generated by the targeting LEDs 109 will appear separated more at one end (i.e., the top or bottom) than the other. Thus, in the example of FIG. 6B, the top separation width d4 between triangles 611, 612 is greater than the bottom separation width d3 between the triangles 611, 612, indicating that the target 610 if off-pitch in a manner such that the bottom of the target 610 is closer than the top of the target 610. The degree of the pitch can be determined, as will be described above, by obtaining the measurements d3 and d4, and also a measurement of height d5 of one of the triangles (e.g., triangle 612), as shown in FIG. 6B.

FIG. 6C is a diagram illustrating a situation where the target 620 is both off-pitch and skewed. The two triangles 621, 622 in FIG. 6C display characteristics of the triangles in both FIGS. 6A and 6B. Thus, the left triangle 621 has a smaller width d1 than the width d2 of the right triangle 622, indicating a skew of the target 620 to the right, and the top separation d4 of the two triangles 621, 622 is larger than the bottom separation d3 of the two triangles 621, 622, indicating that the target 620 is off-pitch, with the top of the target tilted so that it is farther away from the image sensor 105 than the bottom of the target 620.

In a preferred embodiment, as will be explained in more detail with the exemplary flow chart of FIG. 3, after the targeting LEDs 109 are activated, an image of the target with the predetermined illumination pattern is captured and processed. The return image of the predetermined illumination pattern is inspected to determine whether it is distorted in certain ways over the "expected" return image—i.e., the predetermined illumination pattern as it would appear on a target of perfect orientation. Distortion of the return image of the predetermined illumination pattern in certain respects tends to indicate the target is skewed, while in other respects tends to indicate the target is off-pitch, as explained below.

Figure 7:
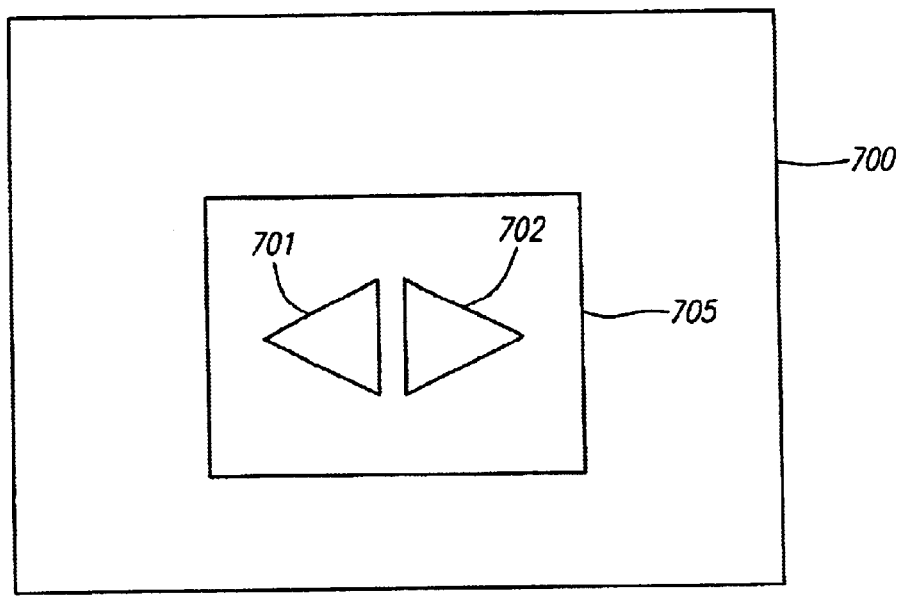
FIG. 7 is a diagram of a central window region in which is searched for the expected illumination pattern.

The two triangles of the illumination pattern are preferably generated in a known region of the image being captured, to facilitate the targeting process. For example, the targeting LEDs 109 may be so oriented with respect to the image sensor 105 that the two triangles will lie within a center window of the captured image. An illustration of this effect is shown in FIG. 7, wherein two triangles 701, 702 generated by pointing LEDs 109 are located in a central region 705 of the captured image 700.

In a preferred embodiment, during the targeting process, only the central region 705 of the captured image 700 is processed, so as to reduce the processing required to determine the orientation of the target. Accordingly, in step 302 of the targeting process 300, the contents of the central window 705 are read out sequentially, line by line. If the image sensor 105 of the optical reader 100 is an active pixel CMOS sensor, then selection of the pixels within the central window 705 may be easily performed by the readout control 112. Alternatively, if the image sensor 105 comprises an area CCD array in which all pixels need to be read out, then the signal processor 115 may comprise selection circuitry which, during the targeting process 300, discards information not within the central window 705. In such an embodiment, the controller 120 may load window coordinate identification registers (not shown) in the signal processor 115, so that such selection circuitry may know the coordinates of the central window 705, and so the size and location of the central window 705 can be programmably altered, if necessary.

Preferably, the image sensor 105 comprises a two-dimensional, rectangular CMOS array having at least several hundred or several thousand pixels in each direction (both height and width). In a presently preferred embodiment, the image sensor 105 comprises a rectangular array having 640×480 pixels, and the central window region is approximately 100×100 pixels in size. The larger the number of pixels, the greater the possible resolution of the image.

The remaining steps 303 through 308 (including sub-steps 320 through 322 and 330 through 332) may all generally be performed by the controller 120, with the pixel data being stored in memory 121. In a next step 303 of the targeting process 300, contrast enhancement is performed on the windowed image (i.e., on the image read out from the central window 705). Generally, the illumination pattern (i.e., triangles 401, 402) generated by the targeting LEDs 109 will be much brighter than the surrounding portions of the target and background. Therefore, contrast enhancement usually helps further identify the illumination pattern in downstream processing. Should the illumination pattern be incident upon a barcode or symbol, or some other printed part of the target, the illuminated portion should still be brighter than the portion of the target and background outside the illumination pattern. With contrast enhancement, the printing or other darker parts of the target appearing within the illumination pattern should, after contrast enhancement, also appear brighter (and hence easier to distinguish) over the outlying parts of the target and background.

A preferred method of contrast enhancement is set forth in sub-steps 320 to 322 in FIG. 3. In general, the contrast enhancement process involves expanding the range of light and dark in the windowed image to the maximum ranges of light and dark that can be internally represented by the processing electronics of the optical reader 100. For example, the image data may, after A/D conversion, comprise gray-scale pixel values represented by 8-bit digital numerical values, with a numerical value of 255 corresponding to one extreme (e.g., maximum lightness or pure white), a numerical value of 0, the maximum number that can be represented using 8 bits, corresponding to the other extreme (e.g., maximum darkness, or pure black), and numerical values between 0 and 255 corresponding to gradually varying degrees of gray, from very white near 255 to very dark near 0.

For a given captured image, the gray-scale pixel data may not span the entirety of the possible range. In fact, it is quite likely that it will span only a small subset of the possible range. Thus, for example, the windowed part of the captured image may have numerical pixel values ranging from, e.g., 80 (typically within the illumination pattern) to, e.g., 30

(typically outside the illumination pattern, as part of the target or background). In such a case, only a range of roughly 50 of the possible range of 255 would be utilized.

In the contrast enhancement process illustrated in FIG. 3, the gray-scale data is expanded to cover the entire possible range of pixel values. In a first step 320 for contrast enhancement, the high and low pixel values are determined. For the above example, the low pixel value would be 30, and the high pixel value would be 80. In a next step 321, the low value is subtracted from every pixel value within the windowed portion 705 of the captured image 700. Thus, those pixels having the lowest pixel value (i.e., 30) would be forced to a numerical value of 0. Those pixels with values above the lowest would be reduced in value by that amount. The net effect is to slide the entire range of pixel values down by the lowest pixel value—in the above example, after step 321, the pixels would range in value from 0 to 50.

Figure 8:
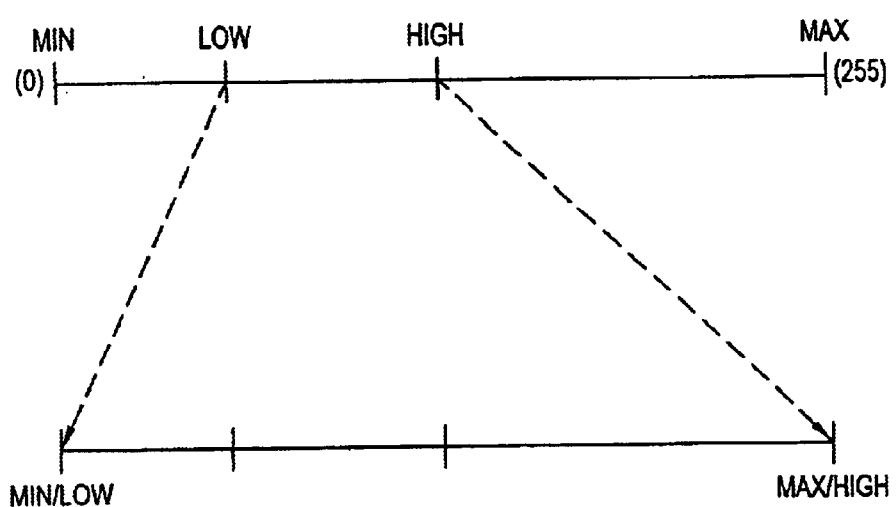
FIG. 8 is a diagram illustrating contrast enhancement.

In a next step 322, every pixel value within the windowed portion 705 of the captured image 700 is normalized by a factor which serves to expand the range of pixel values to the extreme pixel values. Thus, in step 322, each pixel value within the windowed portion 705 is multiplied by a factor of $255/P'_H$, where $P'_H$ is the new high pixel value (i.e., equal to the high pixel value $P_H$ minus the low pixel value PL). Continuing with the above example, each pixel value within the windowed portion 705 of the captured image 700 would be multiplied by a factor of 255/(80−30) or 255/50. As a result, the lightest pixel would take on a pixel value of the maximum lightest value representable—that is, 50×(255/50)=255. The darkest pixel would remain 0, the minimum pixel value. The pixels having values in between 0 and 50 would be spread out between 0 and 255. The end result is a contrast-enhanced image corresponding to the windowed portion 705 of the captured image 700. FIG. 8 is a diagram illustrating the effect of the contrast enhancement process.

In a next step 304 of the targeting process, the contrast-enhanced image is binarized. A preferred method of binarization is set forth in sub-steps 330 to 332 in FIG. 3. In general, the binarization process involves setting each pixel in the contrast-enhanced image to either black or white (which may be represented as 1 and 0, respectively), to end up with a black and white image. Pixels which are white or light gray are set to have a value of 0 (white) in the resulting binary image, while pixels which are black or dark gray are set of have a value of 1 (black) in the resulting binary image. In the preferred method of binarization illustrated in FIG. 3, a mean (average) pixel value is calculated for all of the pixels in the contrast-enhanced image. To do so, all of the pixel values are added up for all of the pixels in the contrast-enhanced image, and the resulting sum is divided by the total number of pixels, thereby arriving at an average pixel value between 0 and 255.

In a following step 231, a threshold is selected for the binarization process. The threshold may be a preset value, but is preferably an adaptive threshold based on the average pixel value. In one embodiment, for example, the binarization threshold is set to 0.9 times the value of the average pixel value derived above.

In a next step 332, a thresholding test is applies to each pixel of the contrast-enhanced image, so as to arrive at a binarized image. For each pixel of the contrast-enhanced image, if the pixel value is above the threshold, then the pixel value is set to 1 (black), while if the pixel value is below the threshold, then the pixel value is set to 0 (white). As a result, a binarized image is generated. The two triangles of the illumination pattern will generally appear as all white, due to the strength of the artificial illumination on the target, whereas the other parts of the target and background will generally appear as all black.

Once the binarized image has been generated, the remaining steps in the targeting process 300 generally involve locating and analyzing the return image of the predetermined illumination pattern (i.e., triangles) to determine characteristics of the target such as pitch and skew. Thus, in a next step 305 of the targeting process 300, the triangles are located in the binarized image. In a preferred embodiment, this step 305 is carried out by starting at a central location in the binarized image, and evaluating pixels in outwardly along the horizontal axis (both directions) until a white region in each direction is encountered. A wide variety of algorithms, such as template matching, may be employed to identify the triangles (or other selected illumination pattern), and such algorithms are considered within the purview of those skilled in the art.

In a next step 306, once the triangles are initially located, the skew, if any, of the target is determined. The skew is determined by first calculating the relative widths of the right triangle 601 and left triangle 602, as shown in FIG. 6A, for example. The controller 120 may determine the width of each triangle 601, 602 by measuring the longest white line (i.e., number of consecutive white pixels) on each side in the region around the horizontal axis of the binarized image, stopping the process when a maximum peak is reached. Alternative methods of determining the width of each triangle 601, 602 may also be used. The angle of skew ($\theta_S$) is then determined according to the following formula:

$$\theta_S = \cos^{-1}(d1/d2)$$

where, as noted before, d1 represents the width of the left triangle 601 and d2 represents the width of the right triangle 602.

In a next step 307, the angle of pitch, if any, of the target is determined. The pitch angle is determined by first calculating the relative separations d4, d3 at top and bottom of the right triangle 611 and left triangle 612, and by determining a height d5 of one of the triangles 611 or 612, as shown in FIG. 6B, for example. In the case the target is both skewed and off-pitch, the height of the longer triangle is selected for the calculation of the pitch angle (e.g., in FIG. 6C, the height of triangle 622 would be used).

The controller 120 may determine the separation between the two triangles 601, 602 by measuring the length (i.e., number of consecutive pixels) of the black line at the top two corners of triangles 611, 612, and at the bottom two corners of the triangles 611, 612. The corners may be identified in each triangle 611, 612 by, for example, finding the shortest white line at top and bottom of each triangle 611, 612 that is part of the solid triangle 611 or 612. Alternative methods of determining the separation of the two triangles 611, 612 may also be used. The height d5 of the triangle 612 maybe determined by, for example, identifying the lower edge of the right triangle 612, and calculating the distance to the top point of the triangle (which was used to determine the separation distance d4) using a simple linear distance formula. The angle of pitch ($\theta p$) is then determined according to the following formula:

$$\theta_P = \tan^{-1}(d5/(d4-d3))$$

Once the skew angle and pitch angle have been calculated in steps 306 and 307, in a next step 308, the controller 120 determines correction factors to apply for the skew and pitch when reading the target and, if appropriate, decoding the contents of the target image. For example, based upon the determined angles of pitch and skew, the captured image may be expanded or compressed proportionally to compensate for the skew and pitch. In the example of FIG. 6A, for example, where skew is present, the portions of the target toward the left could be expanded in width, or alternatively, the portions of the target toward the right could be compressed in width, each in proportion to the relative distance of that part of the target from a reference point, so that the features will be in correct proportion from the standpoint of width. Similarly, the features on the left may be compressed in height, or alternatively, the features on the right may be expanded in height, each in proportion to the relative distance of that part of the target from a reference point, so that the features will be in correct proportion from the standpoint of height.

Likewise, in the example of FIG. 6B, the portions of the target toward the top could be expanded in width, or alternatively, the portions of the target toward the bottom could be compressed in width, each in proportion to the relative distance of that part of the target from a reference point, so that the features will be in correct proportion from the standpoint of width. Similarly, the features towards the top may be compressed in height, or alternatively, the features towards the bottom may be expanded in height, each in proportion to the relative distance of that part of the target from a reference point, so that the features will be in correct proportion from the standpoint of height.

A variety of other corrective techniques may be applied once the skew and/or pitch of the target is determined according to the previously described processes.

In one embodiment, the image sensor 105 utilizes a destructive reading process, such that a second image capture is needed to read the target 104. In such an embodiment, the first image capture is used for the purpose of targeting (i.e., determining pitch and skew), and the second image capture is used for reading and decoding of the target 104 itself. Adjustments for pitch, skew or other measured characteristics of the target from the first read area applied to the captured image from the second read.

Alternatively, the entire contents of the image sensor 105 from a first image capture can be transferred to the memory 121, and the controller 120 can first analyze the pixel data from the captured image to determine pitch and skew, and then apply correction factors when interpreting the data. The pitch and skew correction factors may also be applied for subsequently captured images with the same target.

As another alternative, a non-destructive readout process can be used with the image sensor 105. In such an alternative approach, a central window of pixel data is read out first for the purposes of determining pitch and skew of the target, and then the entire captured image is subsequently read out from the image sensor 105 for processing according to the calculated skew and pitch. The pitch and skew correction factors may also be applied for subsequently captured images with the same target.

Alternatively, or in addition, correction factors for pitch, skew or other measured target characteristics can be applied to the optics and/or signal processing components of the system after the pitch and/or skew have been determined for subsequent reads. For example, data may be clocked out of the image sensor 105 at a variable rate, or may be delayed downstream from the image sensor 105 with a variable delay period, dependent upon what part of the image is being read out. Similarly, adjustments may be made to the lens or optics to compensate for the skew or pitch on a subsequent read. For example, the optics may include a movable lens element or a piezo-electrically controlled lens that shifts in orientation or focal characteristics to compensate for the pitch and/or skew during the reading process.

Certain other embodiments as described herein relate to triggerless optical reading operations, wherein the optical reader is "activated" (i.e., armed) automatically under certain conditions, without the need for the user to pull a trigger, for example. One such embodiment appears in FIG. 9. As illustrated therein, an optical reader 910 comprises a handle 911 connected to an optical reading head 912. A stand 904 for the optical reader 910 comprises a base 901, arm 902, and cradle 903. The optical reader 910 is placed in the cradle 903 and positioned to view downwards therefrom, while the base 901, arm 902 and cradle 903 are so oriented that the viewpath of the optical reader 910 is directed upon a known target 920—in this example, a solid circle on a contrasting background (i.e., a solid black circle on a white background).

As will be apparent to those skilled in the art, many other predefined targets (whether shapes, characters or other symbols) may be utilized, and may include gray portions as well as black and white. In general, solid geometric shapes having symmetry about a point or axis are preferred, since they simplify the recognition process. In particular, a solid circle is presently preferred as the known target 920 because, among other things, it is skew-independent. While skew of the known target 920 is not ordinarily expected when the optical reader is properly oriented and positioned in its cradle 903, sloppy use by the operator or jostling of the stand 904 may cause the orientation of the optical reader to shift, and skew of the known target 920 to occur.

In general, so long as the optical reader 910 continues to detect the known target 920 (i.e., the black circle), then its operation will be inhibited and it will not attempt to decode (or transmit to a host) information that it is reading. However, if the optical reader 910 fails to detect the known target 920, then the optical reader 910 will become "active", and starts reading and decoding data in order to recognize barcodes, symbols or other indicia.

Figure 10:
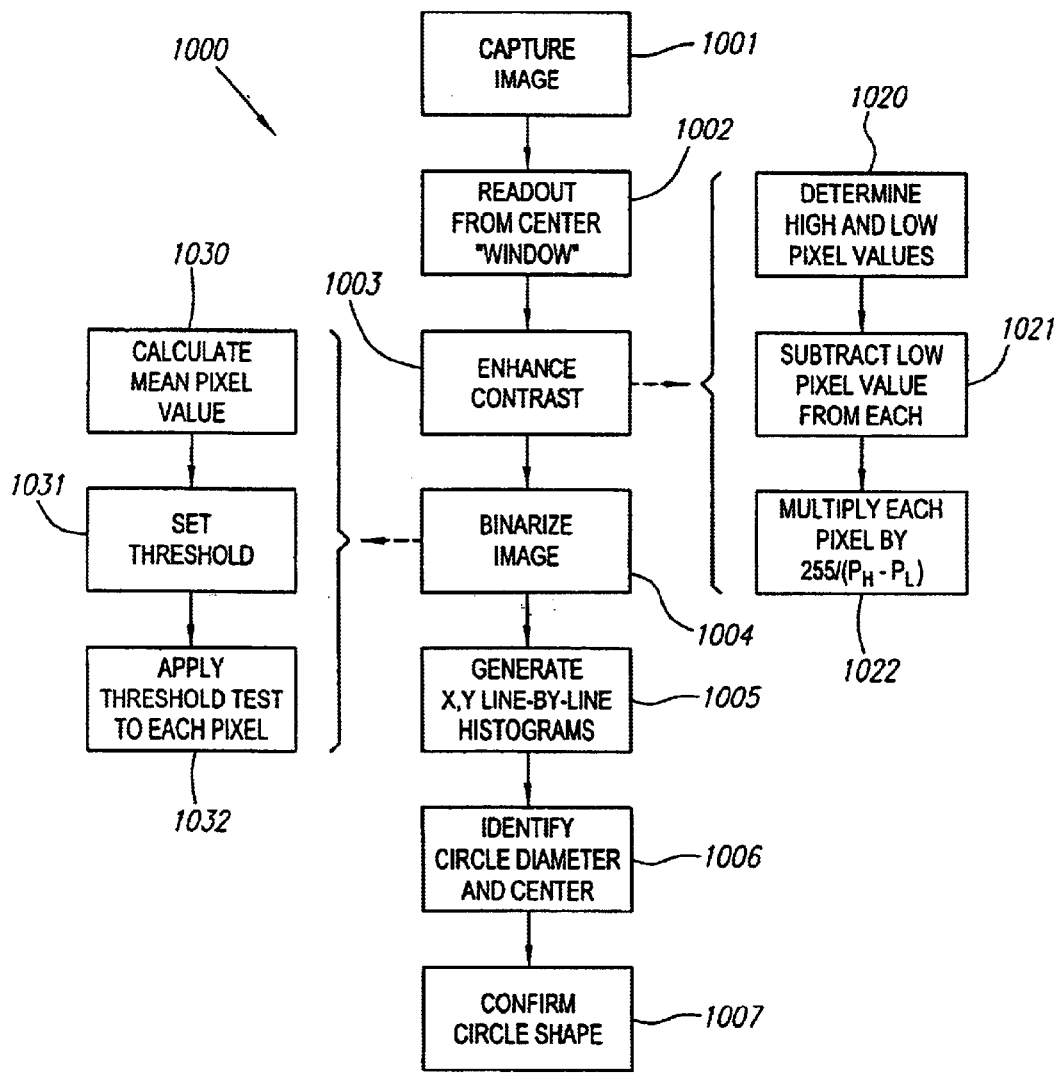
FIG. 10 is a flow chart in accordance with a preferred process for identifying a known target for the purpose of inhibiting reading operations thereby.
Figure 11:
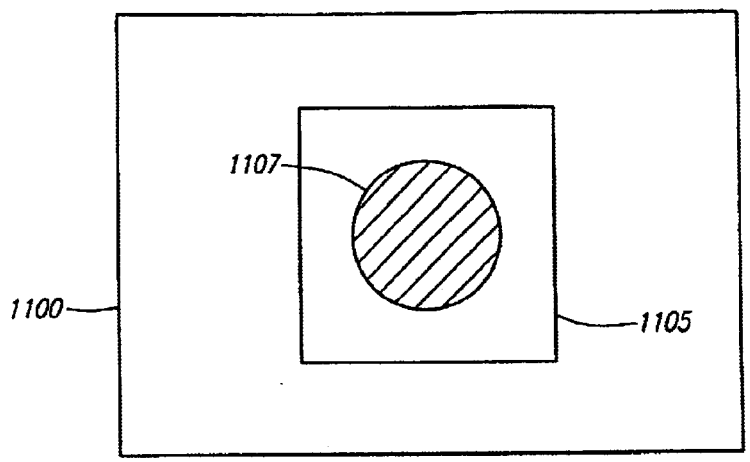
FIG. 11 is a diagram of a central window region in which is searched for the known target.

A preferred process 1000 for performing triggerless optical reading is shown in flow chart form in FIG. 10. The first part of the process 1000 is very similar to the process 300 for skew and pitch detection illustrated in FIG. 3. Steps 1001 through 1004 of FIG. 10 therefore correspond to steps 301 through 304, respectively, of FIG. 3. As with FIG. 3, an image is captured in step 1001. In step 1001, however, an image is periodically captured and analyzed to detect the known target 920, while in step 301 of FIG. 3, an image is normally captured as part of a target-reading process (and may be initiated by either pulling a trigger, or by a triggerless process as described herein).

Also similar to the process 300 of FIG. 3, in step 1002 only data from a center window 1105 (see FIG. 8) is read out, and the known target 920 is preferably located on the base 901 of the stand 904 such that it appears as close to the center as possible of the center window region 1105 of the captured image 1100. However, it is not essential for operation of the process 1000 that only a central window region 1105 of pixel data be processed, although it does facilitate processing.

As with the process 300 of FIG. 3, the windowed image 1105 undergoes a contrast-enhancement process in step 1003, and then undergoes a binarization process in step 1004, preferably according to the same techniques as described previously herein in relation to steps 303 and 304 of FIG. 3, or using any other suitable techniques.

Figure 12:
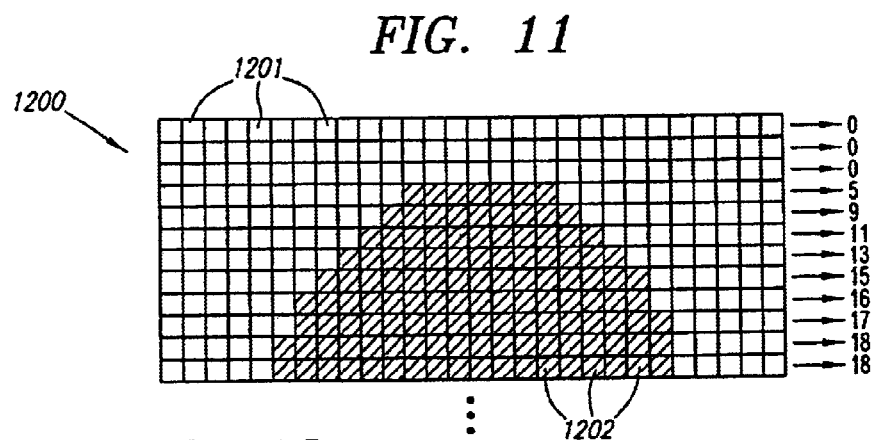
FIG. 12 is a diagram illustrating a preferred manner of histogram generation in accordance with the process set forth in the flow chart of FIG. 10.

A partial representation of the resultant binarized image is illustrated in FIG. 12, according to the example where the known target 920 is a black circle on a white background. In FIG. 12, the binarized image 1200 comprises black pixels 1202 generally forming a solid black circle, and white pixels 1201 surrounding the black pixels 1202. In steps 1005, 1006 and 1007, the controller 120 determines whether the known target 920 (i.e., the black circle on a white background) is present. A variety of techniques can be used to accomplish this confirmation. According to the example illustrated by process 1000 in FIG. 10, in step 1005, histograms are generated for each horizontal line and each vertical line of the binarized image 1200, indicating the total number of black pixels in each line. In the example shown in FIG. 12, the first three lines of the binarized image 1200 have zero black pixels, the fourth line has 5 black pixels, the fifth line has 9 black pixels, the sixth line has 11 black pixels, and so on. It is expected that, if a black circle were present, the number of pixels in each histogram will gradually increase to a maximum, and then gradually decrease until the bottom of the circle is reached and no more black pixels occur. The same histogram process is performed on the vertical lines as well as the horizontal.

In a next step 1006, the center and diameter of the black circle are identified. The (x, y) coordinates of the center of the black circle may be identified, for example, as the x-line and y-line of the binarized image each having the maximum histogram value for all the vertical lines and all the horizontal lines, respectively. The diameter of the circle can be determined as the maximum x-histogram value or y-histogram value (as each will, if the circle is present, correspond to a diameter along the x-axis or y-axis and crossing through the centerpoint of the circle), or else can be set to the average of the maximum x-histogram value and y-line histogram value. The radius of the black circle can be calculated as one-half of the diameter. Alternatively, if the center of the circle has been determined, the radius can be calculated without calculating the diameter according to the following formula:

$$R = [(x-a)^2 + (y-b)^2]^{1/2}$$

wherein R is the radius, a is the x-coordinate of the center point, b is the y-coordinate of the center point, and x and y are the coordinates of a selected point on the edge of the black circle. The radius calculation may be confirmed by using several additional points around the edge of the black circle.

In a next step 1007, a confirmation process is performed to ensure that the interior of the identified circle is, in fact, solidly black, and that the surrounding is, in fact, solidly white. A variety of techniques may be used to accomplish such confirmation. In a preferred embodiment, selected points are tested on the interior and exterior of the identified circle, in order to confirm that the black circle on white background has indeed been detected.

Figure 13:
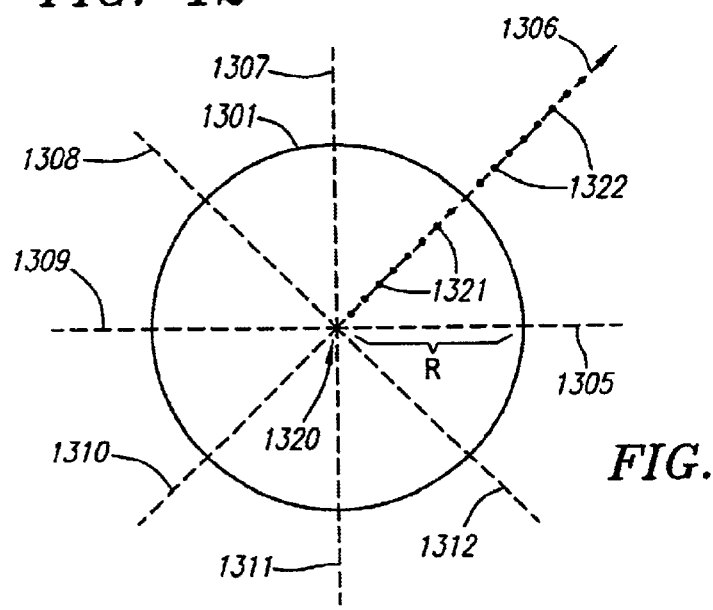
FIG. 13 is a diagram illustrating a preferred manner of target confirmation in accordance with the process set forth in the flow chart of FIG. 10.

Such a process may be explained with reference to FIG. 13, which shows an identified (but unconfirmed) circle 1301 having a centerpoint 1320, and a radius R. According to one embodiment, a number of points are tested inside and outside the identified circle 1301, at equidistant intervals along test pattern lines at various selected angles. If a sufficient number of test points within the identified circle 1301 are not black, or if a sufficient number of test points outside of the identified circle 1301 are not white, then it may be concluded that the known target 1320 (i.e., the black circle on a white background) has not been detected.

In more detail, a series of test pattern lines 1305, 1306, . . . 1312 are generated according to any of a variety of techniques. In the example of FIG. 13, the test pattern lines 1305, 1306, . . . 1312 are separated by increments of 45°, starting with 0°, so that test pattern line 1305 is at an angle of 0°, test pattern line 1306 is at an angle of 45°, test pattern line 1307 is at an angle of 90°, and so on, all the way up to test pattern line 1312, which is at an angle of 315° (i.e., −45°). For each test pattern line 1305, 1306, . . . 1312, a set of test points are calculated along the test pattern line within and without the circle 1301. Thus, for example, for test pattern line 1306, a set of eight test points 1321 are calculated within the cicle 1301, and a set of eight test points 1322 are calculated outside of the circle. Each of the test points 1321 within the identified circle 1301 should be black, while each of the test points 1322 outside of the identified circle 1301 should be white. More generally, the coordinates for interior test points 1321 along each of the test pattern lines 1305, 1306 . . . 1312 may be derived according to the following formula:

$$x(\phi) = (nR/(N+1)) \cdot \cos(\phi) + a, \text{ and}$$

$$y(\phi) = (nR/(N+1)) \cdot \sin(\phi) + b,$$

where (a, b) are the center coordinates of the identified circle 1301, φ is the angle of interest, N is the number of test points, and n is the ordinal number (1 . . . 8) of the test point 1321. Thus, for 8 test points 1321, each test point 1321 is incrementally ⅑ of the radius distance further from the centerpoint 1320 (with (N+1) being used as the divisor instead of N to avoid a test point from landing on the edge of the circle 1301). The exterior test points 1322 can easily be derived in a similar fashion—that is, according to the formula:

$$x(\phi) = (1 + (nR/(N+1))) \cdot \cos(\phi) + a, \text{ and}$$

$$y(\phi) = (1 + (nR/(N+1))) \cdot \sin(\phi) + b.$$

Alternatively, the test points may be determined in fixed steps along each test pattern line 1305, 1306, etc. Thus, for example, the fixed step may be set as 5 pixels, and the test points would then be located at 5 pixels, 10 pixels, 15 pixels, etc., from the centerpoint 1320 of the circle 1301. The total number of steps, and thus the total number of test points, would be dictated by the radius R of the circle 1301. An equal number of points could be tested inside and outside of the circle 1301.

If any of the tests in steps 1106 or 1107 fail, then it may be concluded that the known target 920 has not been detected. Thus, for example, if in step 1106 the pattern of histograms in the x-direction or y-direction does not indicate a progressively increasing number of black pixels followed by a progressively decreasing number of black pixels (i.e., a circular shape), then it may be concluded that the known target 920 has not been detected. Similarly, if too many points on the interior of the identified circle 1301 are white, and/or too many points on the exterior of the identified circle 1301 are black, then it may be concluded that the known target 920 (i.e., a solid black circle on a white background) has not been detected.

If the known target 920 is identified by the optical reader 910, then the optical reader 910 goes into an "arm" (i.e., standby) state, simulating trigger release. However, if the known target 920 is not present, then the optical reader 910 will become activated, simulating trigger pull. The optical reader 910 then enters a scanning mode for one or more cycles, until the known target 920 is viewed again.

An operator may utilize the optical reader 910 in one way by leaving the optical reader 910 in the cradle 903 continuously. When the operator wants to have a bar code, symbol or other indicia read by the optical reader 910, the operator may present the target in the view path of the optical reader 910, between the optical reader head 912 and the known target 920 on the base 901. When the operator interposes the target in such a fashion, the optical reader 910 will not be able to view the known target 920, which will cause the optical reader to simulate a trigger pull and commence optical reading and, if so programmed, decoding. When the operator removes the target from the field of view of the optical reader 910 such that the known target 920 becomes visible to the optical reader 910 again, the optical reader 910 re-enters a standby mode, wherein trigger release is simulated, and awaits the next target. During the standby mode, the optical reader 910 continues to capture images periodically so as to ensure that the known target 920 is still visible. In one aspect, hands free operation of the optical reader 910 is provided.

As an alternative to the operator presenting targets to the optical reader 910 when the optical reader 910 remains in the cradle 903, the operator may simply remove the optical reader 910 from the cradle 903 so that the known target 920 is no longer visible, and the optical reader 910 will then simulate a trigger pull and begin reading and, if so programmed, decoding.

Any data collected or decoded by the optical reader 910 may be transmitted over a cable 925 to a host (not shown). Decoding may be performed in the host if it is not done in the optical reader 910. In some circumstances, it may be desired to capture an image that is not amenable to decoding, such as a driver's license photograph. The host may communicate with the optical reader 910, and thereby command the optical reader 910 to enter certain modes or else download programming information to the optical reader 910.

Figure 14:
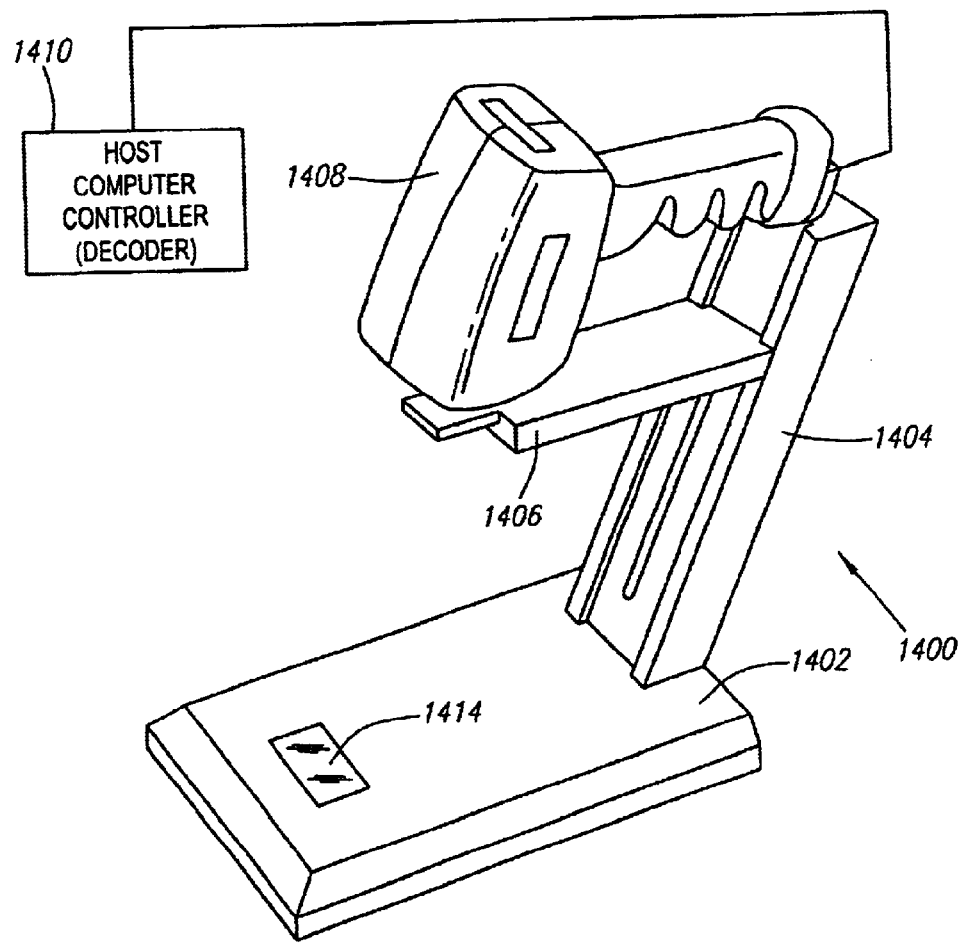
FIG. 14 is a diagram of a triggerless optical reader in accordance with another embodiment as described herein.

FIG. 14 is a diagram of a triggerless optical reader in accordance with another embodiment as described herein. As shown in FIG. 14, an optical reading system 1400 comprises an optical reader 1408. An optical reader stand 1404 comprises a base 1402 having an arm 1404 and a extending member (or cradle) 1406 on which the optical reader 1408 can rest. The optical reader 1408 is oriented so that it faces downward over the base 1402 of the stand. A small reflector 1414 in the form of a piece of reflective tape is attached to the upper surface of the base 1402, within the field of view (and preferably near the center of the field of view) of the optical reader 1408. The tape is preferably of the type using corner reflecting particles and is commercially available from various sources such as the Minnesota Mining & Manufacturing Company of Minneapolis, Minn.

Periodically, the optical reader 1408 captures an image and processes the image to determine whether the reflector 1414 is present beneath the optical reader 1408; if so, the optical reader 1408 simulates a trigger release and remains in a standby mode. If the reflector 1414 is not visible to the optical reader 1408, it is assumed that a target has been interposed along the viewpath of the optical reader 1408 towards the reflector 1414, or that the optical reader 1408 has been removed from its cradle 1406, and the optical reader 1408 therefore leaves the standby mode and commences reading and, if so programmed, decoding.

The optical reader 1408 may comprise, for example, the circuitry and components illustrated in FIG. 1, or any other suitable image capture circuitry. Taking for a moment the example in which the optical reader 1408 utilizes the circuitry of FIG. 1, the presence of the reflector 1414 may be detected by capturing an image using image sensor 105 and processing the image. Preferably, the illumination source 103 is activated periodically in synchronization with the image capture process so as to cause the reflector 1414 to return a high intensity of light. The resulting image captured by the image sensor 105 will appear as a very bright rectangle corresponding to the reflector 1414 (assuming the reflector 1414 is rectangular in shape) against a black background.

As the image data is captured by the image sensor 105, it is processed by the signal processor 115 and stored in memory 121 in an ordinary manner as described elsewhere herein in relation to FIG. 1. The rectangular shape of the reflector 1414 may be identified by a recognition program invoked by the controller 120; for example, it may be identified by recognizing a multiplicity of consecutive lines of the image all having essentially the same number of consecutive white pixels at essentially the same starting and stopping points. Other techniques for identifying the rectangular shape of the reflector 1414 may also be used.

Alternatively, rather than processing the image data by the controller 120, the image data can be processed line-by-line by edge detection circuitry that is included with the signal processor 115 for this purpose. When the optical reader 1410 is in a standby mode, the image data may be routed to the edge detection circuitry in lieu of the controller 120. If the reflector 1414 is present, then the edge detection circuitry should detect a repeating black-white-black pattern having (within a small tolerance, perhaps) identical characteristics each time. So long as this pattern remains, the optical reader 1410 may remain in standby mode. When the pattern changes and no longer matches the expected characteristics of the reflector 1414, the optical reader 1410 may then enter a reading mode, simulating a trigger pull.

Figure 9:
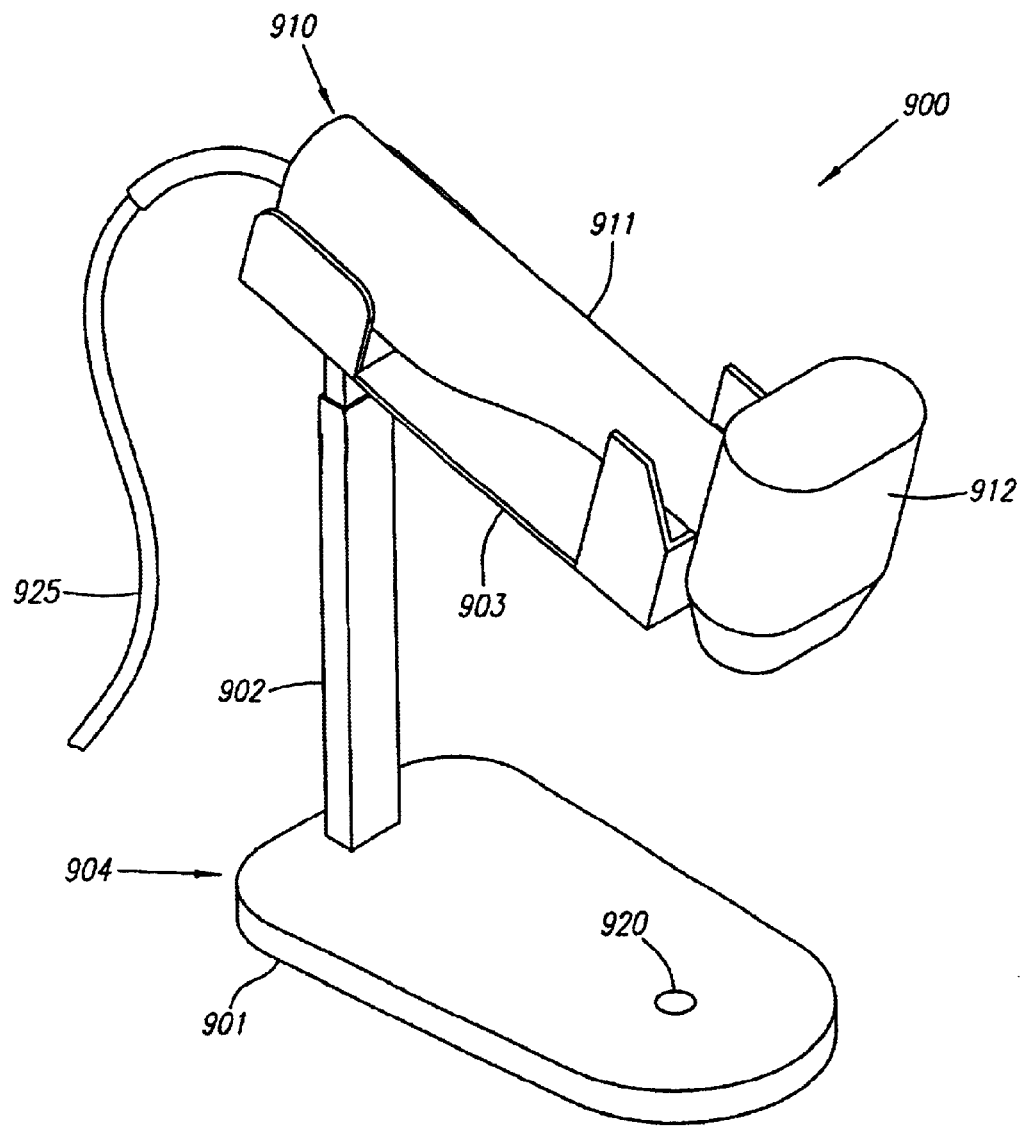
FIG. 9 is a diagram of a triggerless optical reader in accordance with a preferred embodiment as described herein.

As with the optical reader 910 shown in FIG. 9, any data collected or decoded by the optical reader 1408 may be transmitted over a cable 1411 to a host 1410. Decoding may be performed in the host 1410 if it is not done in the optical reader 1408. The host 1410 may communicate with the optical reader 1408, and thereby command the optical reader 1408 to enter certain modes or else download programming information to the optical reader 1408.

According to another feature of one or more embodiments described herein, automatic gain control is included in conjunction with standby mode operations to provide a more nearly constant input signal level for downstream processing, and to avoid saturation of the photosensitive device used in the optical reader. To illustrate the technique, reference is made once again to the optical reader 100 shown in FIG. 1, which may be configured to provide automatic gain control according to the general description above. As illustrated in FIG. 1, an automatic gain control circuit 116 is preferably included as part of the signal processor 115. The automatic gain control circuit 116 receives the raw signal 106 output from the image sensor 105, and amplifies that signal 106 by a variable amount depending upon its signal strength. In a preferred embodiment, the automatic gain control circuit 116 comprises a lookup table having entries (i.e., stored digital values) corresponding to different exposure/gain values. Based on the strength of the signal 106 output from the image sensor 105, the automatic gain control circuit 116 selects an appropriate exposure/gain control level from the lookup table and applies it as a control input to an amplifier, which amplifies in proportion to the selected gain control level from the lookup table. The processor 120 (including uP/uC 125) may, if desired, assist in retrieving the exposure/gain control level from the lookup table based upon a signal strength indication received from the automatic gain control circuit 116. Implementation of an automatic gain control circuit 116 with such features is considered within the purview of those skilled in the art, and therefore the details are not considered necessary of further expansion here.

In a particular embodiment, the automatic gain control level is continuously adjusted when the optical reader is in a standby mode. Then, when the optical reader leaves the standby mode and begins reading, the automatic gain control is pre-adjusted, resulting in a faster read of good data. Accordingly, the optical reader 100 periodically captures an image using the image sensor 105, and reads out the image data for processing by the signal processor 115. The automatic gain control circuit 116 of the signal processor 115 adjusts the gain level in response to the signal level of the image sensor output signal 106. The image data may, but need not, be stored for further processing in memory 121 (for example, for autosensing purposes). When the optical reader 100 leaves standby mode (e.g., when a trigger is pulled by the operator, or when the autosensing feature indicates that a target is present or the optical reader has been removed from the cradle), then, when the next image is captured, the gain level of the automatic gain control circuit 116 is pre-adjusted to an appropriate level.

In various embodiments as described herein, a proximity detection capability may be provided for the optical reader 100, by which the distance from the optical reader 100 (and specifically, the image sensor 105) to the target 104 may be determined. Various proximity detection techniques are conventionally known, and have been utilized, for example, in camera-related applications for performing such tasks as automatic focusing.

In various embodiments of an optical reader as described herein, an auto-focus capability may be provided. Typically in such embodiments, a component in the optical path is adjusted in response to an indication of the distance to the target as derived by the optical reader 100. Such an adjustable component may comprise, for example, a lens or a mirror in the optical path. A proximity detector, including any of the types previously described or referred to herein, or any other suitable proximity detector or ranging mechanism as conventionally known, may be used to sense the distance to the target 104 and adjust the focus of the optical reader in response thereto. Alternatively, the focus of the optical reader may be adjusted to optimize for high frequency information in response to analysis of the image data, according to any of a variety of techniques that are well known in the art.

In various embodiments as described herein, a multi-focal lens may be used. In particular, a multi-focal lens may be utilized for the purpose of increasing the depth of field of the optical system. A variety of multi-focal lenses and other optical techniques which may be utilized in conjunction with the embodiments described herein are set forth in U.S. Pat. Nos. 5,770,847 and 5,814,803, each of which is hereby incorporated by reference as if set forth fully herein.

In various embodiments as described herein, it should be understood that the type of data that may be read and captured by the image sensor 105 is not limited to bar codes or other such symbols. In the various embodiments described herein, unless otherwise specified, any type of symbols, characters, or pictures (e.g., driver's license photos), or other data may be captured by the image sensor 105. Where such data is amenable to decoding, the controller 120 of the optical reader 100 may attempt to decode it; alternatively, the data may be passed along to a host system, or stored locally for later read-out.

It should be noted that the various features described herein, including skew and pitch detection and correction, triggerless operation, automatic gain control, ranging, auto-focus, and the like, may each be used independently or in various combinations with one another.

Although the present invention has been described above in the context of certain preferred embodiments, it is to be understood that various modifications may be made to those embodiments, and various equivalents may be substituted, without departing from the spirit or scope of the invention.

---

COMPUTER CODE APPENDIX

---

Appearing below are sections of computer code written in the computer language of C, implementing algorithms for automatic sensing of a target (i.e., "autosensing"), including contrast enhancement and binarization of the captured image, in accordance with a preferred embodiment as described herein:

```
//----------------------------------------------------------
// check for autosense symbol present
// return true if an autosense symbol present
// return false if an autosense symbol absent
// for easy detection I choose to use a circle as an
// autosense symbol, this symbol will be located as close
// as possible to the center of the imager, and it will
// locate the biggest circle.
char CheckAutoTrig(char *image, BYTE sensitive_level)
{
    char autoresult;
    BYTE pixel,localthres;
    int diameter,radius;
    int blackpixcnt = 0;
    int blackpixcnt1 = 0;
    int maxcnt1 = 0;
    int maxcnt2 = 0;
    BYTE min = 255;
    BYTE max = 0;
    int x,y,sum,xcircle,ycircle;
    // start at center of sensor with Xcenter +/- Xsize/2
    // Ycenter +/- Ysize/2
```

COMPUTER CODE APPENDIX

```
        sum = 0;
        xcircle = 320;    // assume the circle will be at center
        ycircle = 240;
// perform contrast enhancement first
// first calculate min pixel, then use min pixel value
// to do contrast enhancement
        for (y=140;y<340;y++)
        {
          for (x=220;x<420;x++)
          {
            pixel = image[y*640+x];
            if (min >pixel)
              min = pixel;
          }
        }
        for (y=140;y<340;y++)
        {
          for (x=220;x<420;x++)
          {
            pixel = image [y*640+x];
            pixel = pixel − min;
            if (pixel <84)
              image[y*640+x] = pixel *3;
            else
              image[y*640+x] = 255;
          }
        }
        // calculate min pixel value
        for (y=290;y>190;y--)
        {
          for (x=270;x<370;x++)
          {
            pixel = image[y*640+x];
            sum = sum +pixel;
          }
        }
// calculate local threshold
        localthres = sum/(100*100);
        localthres = (localthres*95)/100;
// binarize the image
        for (y=3#0;y>120;y--)
        {
          for (x=150;x<450;x++)
          {
          pixel = image[y*640+x]
          if (pixel > localthres)
              image[y*640+x] = WHITE_PIX;
          else
              image[y*640+x] = BLACK_PIX;
          }
        }
// remove salt and pepper effect
        Isolate_pixel_remove(image);
        for (y=190;y<290;y++)
        {
            for (x=270;x<370;x++)
            {
              pixel = image [y*640+x];
              if (pixel == BLACK_PIX)
                 blackpixcnt++;
            }
            if (blackpixcnt > maxcnt1)
            {
                maxcnt1 = blackpixcnt;
                ycircle = y;
            }
            blackpixcnt = 0;
        }
        // search for max black pixel count => center of circle
        // locate y coordinate of the circle
        for (x=270;x<370;x++)
        {
            for (y=190;y<290;y++)
            {
              pixel = image[y*640+x]
              if (pixel == BLACK_PIX)
                 blackpixcnt++;
```

-continued

COMPUTER CODE APPENDIX

```
        }
        if (blackpixcnt > maxcnt2)
        {
            maxcnt2 = blackpixcnt;
            xcircle = x;
        }
        blackpixcnt = 0;
    }
    if (maxcnt1 > maxcnt2)
        diameter = maxcnt1;
    else
        diameter = maxcnt2;
    // verify that a circle is detected within the window
    // max ~= diameter of the circle, using y^2 + x^2 = r^2
    // calculate y = sqrt(r^2-x^2), then verify 4 vectors
    // of the circle for black pixels inside the circle,
    // and white pixels outside the circle.
        radius = diameter/2;
    // box the circle
    for (x=xcircle-radius;x<xcircle+radius;x++)
    {
        image[(ycircle+radius)*640+x] = BLACK_PIX ;
    }
    for (x=xcircle-radius;x<xcircle+radius;x++)
    {
        image[(ycircle-radius)*640+x] = BLACK_PIX ;
    }
    for (y=ycircle-radius;y<ycircle+radius;y++)
    {
        image[y*640+xcircle+radius] = BLACK_PIX ;
    }
    for (y=ycircle-radius;y<ycircle+radius;y++)
    {
        image[y*640+xcircle-radius] = BLACK_PIX ;
    }
    // outter box
    for (x=xcircle-radius-15;x<xcircle+radius+15;x++)
    {
        image[(ycircle+radius+15)*640+x] = BLACK_PIX ;
    }
    for (x=xcircle-radius-15;x<xcircle+radius+15;x++)
    {
        image[(ycircle-radius-15)*640+x] = BLACK_PIX ;
    }
    for (y=ycircle-radius-15;y<ycircle+radius+15;y++)
    {
        image[y*640+xcircle+radius+15] = BLACK_PIX ;
    }
    for (y=ycircle-radius-15;y<ycircle+radius+15;y++)
    {
        image[y*640+xcircle-radius-15] = BLACK_PIX ;
    }
    if (radius == 0)
        autoresult = FALSE;
    // do not verify circle if circle is not detected
    else
    {
        // calculate 4 sectors around the circle
        // sector 1 @ theta = 0°
        // secter 2 @ theta = 45°
        // sector 3 @ theta = 90°
        // sector 4 @ theta = 135°
        // sector 5 @ theta = 180°
        // y = Radius*sin(theta)
    autoresult =
        verifycircle(image,xcircle,ycircle,radius,BLACK_PIX) ;
    if (autoresult)
            autoresult =
            verifywhitebox(image,xcircle,ycircle,radius+30) ;
    }
    if (autoresult==TRUE)
    {
       if (CircleDet == sensitive_level-1)
       {
       CircleDet = 0;
           PointerMiss = FALSE;
           PointerDet = TRUE;
```

COMPUTER CODE APPENDIX

```
        }
        else
        {
           CircleDet++;
           CircleMiss = 0;
        }
      }
      else
      {
        if (PointerDet==TRUE)
        {
           if(CircleMiss == sensitive_level+1)
           {
              PointerMiss = TRUE;
              PointerDet = FALSE;
              CircleMiss = 0;
           }
           else
           {
             CircleMiss++;
              CircleDet = 0;
           }
        }
      }
      return (PointerDet) ;
}
//--------------------------------------------------------
// calculate Y coordinate and verify inner circle is black
// more points could be checked for more robustness,
// y = r*sin(t)
// theta = 0      => sin(theta) = 0
// theta = 45°    => sin(theta) = .707
// theta = 90°    => sin(theta) = 1
// theta = 135°   => sin(theta) = .707
// theta = 180°   => sin(theta) = 0
// theta = 225°   => sin(theta) = -.707
// theta = 270°   => sin(theta) = -1
// theta = 315°   => sin(theta) = -.707
// theta = 360°   => sin(theta) = 0
char verifycircle(char *image,int xcircle,int ycircle,int radius, BYTE value)
{
      BYTE pixel, step, index;
      char autoresult;
      int sintable1 [ ] = {0,707,1};   // scale by 1000
      int sintable2 [ ] = {707,0};     // scale by 1000
      int x,y,sin;
      autoresult = TRUE;               // assume circle will be detected,
                                       // the checking logic is
for no circle detected
      if (radius > 20)
         radius = radius - 10;
      else                             // circle's radius could
not be less than 10 pixels
      {
          radius = 2;
          autoresult = FALSE;
      }
      // postive quadtran
      for (index=0; index<3; index++)
      {
        sin = sintable1 [index] ;
        for (x = xcircle;x<xcircle+radius;x=x+1)
        {
           y = ycircle-(((x-xcircle) * sin)/1000) ;
           pixel = image[y*640+x] ;
           if (pixel != value)
              autoresult = FALSE;
        }
      }
      // negative quadtran
      for (index=0;index<2;index++)
      {
        sin = sintable2 [index];
        for (x = xcircle - radius;x<xcircle;x=x+1)
        {
```

-continued

COMPUTER CODE APPENDIX

```
      y = ycircle+(( (xcircle-x) * sin)/1000) ;
      pixel = image [y*640+x];
      if (pixel != value)
        autoresult = FALSE;
      }
    }
    return (autoresult);
}
//
//--------------------------------------------------------
// verify external of the circle is white pixels only
// this is very simple checking of four corner.
char verifywhitebox(char *image, int xcircle, int ycircle, int
radius)
{
  BYTE pixel;
  char autoresult = TRUE;
  pixel = image [(ycircle-radius) *640+xcircle] ;
  if (pixel != WHITE_PIX)
    autoresult = FALSE;
  pixel = image (ycircle-radius) *640+xcircle+radius] ;
  if (pixel != WHITE_PIX)
    autoresult = FALSE;
  pixel = image [(ycircle+radius) *640+xcircle] ;
  if (pixel != WHITE_PIX)
    autoresult = FALSE;
  pixel = image (ycircle+radius) *640+xcircle+radius] ;
  if (pixel != WHITE_PIX)
    autoresult = FALSE;
  return (autoresult);
}
// remove salt pepper effect, by removing isolated black
// pixel if any black element is less than 4 pixels then
// remove it
void Isolate_pixel_remove(char *image)
{
  int x,y;
  for (y=140;y<340;y++)
  {
    for (x=170;x<430;x++)
    {
      if((image[y*640+x] ==BLACK_PIX) &&
(image[(y+1)*640+x+1] ==BLACK_PIX) && \
        (image[(y+2)*640+x+2] ==BLACK_PIX)
&&(image[(y+3)*640+x+3] ==BLACK_PIX))
        image [y*640+x] =BLACK_PIX;
      else
        image [y*640+x] =WHITE_PIX;
    }
  }
}
```

© Copyright 1999 PSC Inc. All rights reserved, except as otherwise expressly stated herein.

What is claimed is:

1. A method for optically reading a target using a data reading system, comprising the steps of:
   generating a predetermined targeting pattern and projecting said predetermined targeting pattern onto the target;
   capturing an image of the target and capturing a return image of said predetermined targeting pattern;
   the data reading system measuring distortion in shape of said return image of said predetermined targeting pattern;
   the data reading system determining a characteristic of target orientation based upon said distortion;
   the data reading system compensating for said characteristic of target orientation.

2. The method of claim 1, further comprising the steps of:
   enhancing the contrast of said captured image, thereby generating a contrast-enhanced image; and
   generating a binarized image from said contrast-enhanced image.

3. The method of claim 1, further comprising the step of storing said captured image as a two-dimensional array of gray-scale pixel values.

4. The method of claim 1, wherein said predetermined targeting pattern comprises a pair of symmetrical triangles, and wherein said step of measuring distortion comprises comparing shape of the triangles in said return image being captured to an expected non-distorted return image.

5. The method of claim 1, wherein said characteristic is an angle of pitch of said target.

6. The method of claim 1, wherein said characteristic is an angle of skew of said target.

7. The method of claim 1, wherein said step of measuring distortion of said return image of said predetermined targeting pattern is carried out over a window region within the captured image.

8. The method of claim 1 wherein said targeting pattern comprises a plurality of two-dimensional geometric shapes offset from each other.

9. A method for optically reading a target using a data reading system, comprising the steps of:
generating a predetermined illumination pattern;
capturing an image of the target and capturing a return image of said predetermined illumination pattern;
the data reading system measuring distortion of said return image of said predetermined illumination pattern;
the data reading system determining a characteristic of target orientation based upon said distortion;
the data reading system compensating for said characteristic of target orientation,
wherein said predetermined illumination pattern comprises a pair of symmetrical triangles,
wherein said symmetrical triangles are adjacent, are separated by a narrow contrasting margin, and point outwardly in opposite directions.

10. A method for optically reading a target, comprising the steps of:
generating a predetermined illumination pattern, wherein said predetermined illumination pattern comprises a pair of symmetrical triangles, wherein said symmetrical triangles are adjacent, are separated by a narrow contrasting margin, and point outwardly in opposite directions;
capturing an image of the target, said captured image including a return image of said predetermined illumination pattern;
measuring distortion of said return image of said predetermined illumination pattern, wherein said step of measuring distortion of said return image of said predetermined illumination pattern comprises the steps of identifying a pair of triangles in said return image and measuring a width of each of said triangles; and
determining a characteristic of target orientation based upon said distortion, wherein said step of determining said characteristic of target orientation based upon said distortion comprises the step of calculating an angle of skew of said target based upon the relative measured widths of each of said triangles in said return image.

11. The method of claim 10, wherein said angle of skew is determined according to a formula $$\theta_S = \mathrm{Cos}^{-1}(d1/d2)$$

wherein $\theta_S$ represents the angle of skew, d1 represents the smaller measured width of said triangles, and d2 represents the larger measured width of said triangles.

12. A method for optically reading a target, comprising the steps of:
generating a predetermined illumination pattern, wherein said predetermined illumination pattern comprises a pair of symmetrical triangles, wherein said symmetrical triangles are adjacent, are separated by a narrow contrasting margin, and point outwardly in opposite directions;
capturing an image of the target, said captured image including a return image of said predetermined illumination pattern;
measuring distortion of said return image of said predetermined illumination pattern, wherein said step of measuring distortion of said return image of said predetermined illumination pattern comprises the steps of identifying a pair of triangles in said return image, measuring a separation of said pair of triangles at a top point and at a bottom point of said pair of triangles, and measuring a height of at least one of said triangles; and
determining a characteristic of target orientation based upon said distortion, wherein said step of determining said characteristic of target orientation based upon said distortion comprises the step of calculating an angle of pitch of said target based upon the relative separations of said triangles at said cop point and at said bottom point and upon said measured height of at least one of said triangles in said return image.

13. The method of claim 12, wherein said angle of pitch is determined according to a formula $$\theta_{p} = \mathrm{Tan}^{-1}(d5/(d4-d3))$$

wherein $\theta_P$ represents the angle of pitch, d4 represents the larger of said relative separations of said triangles at said top point and at said bottom point, d3 represents the smaller of said relative separations of said triangles at said top point and at said bottom point, and d5 represents said height of at least one of said triangles of said return image.

14. A method for optically reading a target using a data reading system, comprising the steps of:
generating a predetermined targeting pattern and projecting the targeting pattern onto the target;
capturing an image of the target and capturing a return image of said predetermined targeting pattern;
the data reading system determining a characteristic of orientation of the target based upon differences between said return image of said predetermined targeting pattern and an expected return image of said predetermined illumination targeting pattern;
the data reading system compensating for said characteristic of orientation of the target.

15. The method of claim 14, wherein said predetermined targeting pattern comprises a pair of identical two-dimensional geometric shapes symmetrically disposed about a center axis.

16. The method of claim 14, wherein said step of determining said characteristic of orientation of the target based upon differences between said return image of said predetermined targeting pattern and an expected return image of said predetermined targeting pattern comprises the step of determining an angle of skew of the target.

17. The method of claim 14, wherein said step of determining said characteristic of orientation of the target based upon differences between said return image of said predetermined targeting pattern and an expected return image of said predetermined targeting pattern comprises the step of determining an angle of pitch of the target.

18. A method for optically reading a target using a data reading system, comprising the steps of:
generating a predetermined illumination pattern;
capturing an image of the target and capturing a return image of said predetermined illumination pattern;
the data reading system determining a characteristic of orientation of the target based upon differences between said return image of said predetermined illumination pattern and an expected return image of said predetermined illumination pattern;
the data reading system compensating for said characteristic of orientation of the target,
wherein said predetermined illumination pattern comprises a pair of identical two-dimensional geometric shapes symmetrically disposed about a center axis, wherein said identical shapes comprise isosceles triangles, said isosceles triangles separated by a narrow band.

19. A method for optically reading a target, comprising the steps of;
generating a predetermined illumination pattern, wherein said predetermined illumination pattern comprises a pair of identical shapes symmetrically disposed about a center axis, wherein said identical shapes comprise isosceles triangles, said isosceles triangles separated by a narrow band;
capturing an image of the target, said captured image including a return image of said predetermined illumination pattern; and
determining a characteristic of orientation of the target based upon differences between said return image of said predetermined illumination pattern and an expected return image of said predetermined illumination pattern, wherein said step of determining said characteristic of orientation of the target based upon differences between said return image of said predetermined illumination pattern and an expected return image of said predetermined illumination pattern comprises the step of determining an angle of skew of the target based upon relative measured widths of triangles in said return image.

20. The method of claim 19, further comprising the step of determining a second characteristic of orientation of said target based upon differences between said return image of said predetermined illumination pattern and the expected return image of said predetermined illumination pattern.

21. The method of claim 20, wherein said step of determining a second characteristic of orientation of said target based upon differences between said return image of said predetermined illumination pattern and the expected return image of said predetermined illumination pattern comprises the step of determining an angle of pitch of the target based upon relative separations of said triangles in said return image at a top and bottom of said narrow band and upon a measured height of at least one of said triangles in said return image.

22. A method for data reading using a data reading system, comprising the steps of:
projecting a targeting pattern onto a surface of an item to be read;
capturing an image of the surface of the item and capturing a return image of said targeting pattern; and
the data reading system determining an orientation characteristic of the surface of the item based upon differences between shape of said return image of said targeting pattern being captured and shape of an expected return image of said targeting pattern.

23. A method of data reading according to claim 22 wherein said step of determining an orientation characteristic comprises the step of determining an angle of skew of the surface of the item based upon relative measured widths of triangles in said return image.

24. An optical reading system comprising
means for generating a predetermined targeting pattern;
means for capturing an image of the target and capturing a return image of said predetermined targeting pattern;
means for measuring distortion in shape of said return image of said predetermined targeting pattern;
means for determining a characteristic of target orientation based upon said distortion;
means for compensating for said characteristic of target orientation.

* * * * *

UNITED STATES PATENT AND TRADEMARK OFFICE
CERTIFICATE OF CORRECTION

PATENT NO. : 6,695,209 B1
DATED : February 24, 2004
INVENTOR(S) : Chay K. La

It is certified that error appears in the above-identified patent and that said Letters Patent is hereby corrected as shown below:

Column 3,
Line 8, after "to" at end of paragraph insert -- Longacre, Jr. et al. --
Line 53, change "be" to -- by --.

Column 4,
Line 45, change "a" to -- an --.

Column 9,
Line 12, insert -- is -- before "off-pitch".

Column 11,
Line 60, change "applies" to -- applied --.

Column 15,
Line 66, before "generated" change "are" to -- is --.

Column 16,
Line 7, before "calculated" change "are" to -- is --.
Line 10, change "cicle" to -- circle --.

Column 21,
Line 31, change "for (y=290;y>190;y—)" to -- for (y=290;y>190;y--) --.
Line 43, change "for (y=3#0;y>120;y—)" to -- for (y=360;y>120;y--) --.
Line 47, change "image[y*640+x]" to -- image[y*640+x]; --.
Line 77, change "image[y*640+x]" to -- image[y*640+x]; --.

Column 27,
Line 23, change "image(ycircle-radius)" to -- image[(ycircle-radius) --.
Line 29, change "image(ycircle+radius)" to -- image[(ycircle+radius) --.

Column 30,
Line 11, change "cop" to -- top --.
Line 33, delete "illumination".

UNITED STATES PATENT AND TRADEMARK OFFICE
CERTIFICATE OF CORRECTION

PATENT NO. : 6,695,209 B1
DATED : February 24, 2004
INVENTOR(S) : Chay K. La

It is certified that error appears in the above-identified patent and that said Letters Patent is hereby corrected as shown below:

Column 31,
Line 5, change ";" to -- : --.

Signed and Sealed this

Second Day of August, 2005

JON W. DUDAS
*Director of the United States Patent and Trademark Office*